(12) United States Patent
Gao et al.

(10) Patent No.: US 10,833,816 B2
(45) Date of Patent: Nov. 10, 2020

(54) TRANSMISSION METHOD AND APPARATUS FOR FEEDBACK INFORMATION OF UPLINK TRANSMISSION

(71) Applicant: China Academy of Telecommunications Technology, Beijing (CN)

(72) Inventors: Xuejuan Gao, Beijing (CN); Xueming Pan, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 16/313,125

(22) PCT Filed: Mar. 9, 2017

(86) PCT No.: PCT/CN2017/076196
§ 371 (c)(1),
(2) Date: Dec. 24, 2018

(87) PCT Pub. No.: WO2017/219703
PCT Pub. Date: Dec. 28, 2017

(65) Prior Publication Data
US 2019/0165899 A1    May 30, 2019

(30) Foreign Application Priority Data

Jun. 22, 2016 (CN) .......................... 2016 1 0460911
Aug. 5, 2016 (CN) .......................... 2016 1 0641360
Aug. 15, 2016 (CN) .......................... 2016 1 0671985

(51) Int. Cl.
*H04W 4/00* (2018.01)
*H04L 1/18* (2006.01)
(Continued)

(52) U.S. Cl.
CPC .......... *H04L 1/1861* (2013.01); *H04L 1/1816* (2013.01); *H04L 5/14* (2013.01);
(Continued)

(58) Field of Classification Search
CPC ..... H04L 1/1861; H04L 5/14; H04L 27/0014; H04W 76/11
See application file for complete search history.

(56) References Cited

U.S. PATENT DOCUMENTS 9,532,369 B2 * 12/2016 Susitaival ............. H04L 5/1469
2014/0105191 A1    4/2014 Yang et al.
(Continued)

FOREIGN PATENT DOCUMENTS

CN        104067681 A      9/2014
CN        104144508 A      11/2014
(Continued)

OTHER PUBLICATIONS

LG (R1-154, 234, "Details of DCI content for MTC", Beijing, China, Aug. 24-28, 2015). (Year: 2015).*
(Continued)

*Primary Examiner* — Maharishi V Khirodhar
(74) *Attorney, Agent, or Firm* — Kilpatrick Townsend & Stockton, LLP

(57) ABSTRACT

The present invention discloses a transmission method and apparatus for feedback information of uplink transmission. The method comprises: a terminal transmitting a physical uplink shared channel (PUSCH) in a special sub-frame m, where m is an integer; the terminal detecting, subsequent to the special frame m, in a sub-frame comprising downlink transmission resources or in a sub-frame m+k, a downlink control channel using an uplink/downlink control information (DCI) format, where k is a positive integer; and the terminal determining, according to the downlink control
(Continued)

channel, whether to again transmit the PUSCH transmitted in the special sub-frame m. accordingly, the present invention provides a transmission solution that transmits PUSCH feedback information in a special sub frame, ensuring that the PUSCH transmitted in the special sub frame can normally obtain ACK/NACK feedback information.

26 Claims, 4 Drawing Sheets

(51) Int. Cl.
    *H04W 92/10*     (2009.01)
    *H04W 76/11*     (2018.01)
    *H04L 5/14*     (2006.01)
    *H04L 27/00*     (2006.01)

(52) U.S. Cl.
    CPC ......... *H04L 27/0014* (2013.01); *H04W 76/11* (2018.02); *H04W 92/10* (2013.01); *H04L 2027/0095* (2013.01)

(56) References Cited

U.S. PATENT DOCUMENTS

| | | | |
|---|---|---|---|
| 2014/0133370 A1* | 5/2014 | Chen ................. | H04W 72/042 370/280 |
| 2015/0043434 A1 | 2/2015 | Yamada et al. | |
| 2015/0365198 A1 | 12/2015 | Tabet et al. | |
| 2017/0034819 A1* | 2/2017 | Wang ................. | H04L 5/1469 |
| 2017/0105212 A1* | 4/2017 | Li ..................... | H04L 5/0053 |
| 2017/0317790 A1* | 11/2017 | Yao ................... | H04L 1/1812 |

FOREIGN PATENT DOCUMENTS

| | | | | |
|---|---|---|---|---|
| EP | 3151460 A1 | 4/2017 | | |
| JP | 2016513929 A | 5/2016 | | |
| KR | 20160005327 A | 1/2016 | | |
| WO | 2013051980 A1 | 4/2013 | | |
| WO | 2015009004 A1 | 1/2015 | | |
| WO | 2015154310 A1 | 10/2015 | | |
| WO | 2015196460 A1 | 12/2015 | | |
| WO | WO-2015196460 A1 * | 12/2015 | ............... | H04L 5/00 |
| WO | WO-2017185294 A1 * | 11/2017 | ........... | H04L 1/1812 |

OTHER PUBLICATIONS

MediaTek, R1-154715, "PHICH functionality support based on compact DCI", Beijing China, Aug. 24-28, 2015 (Year: 2015).*

Nokia, R1-153831, "HARQ ACK/NACK for PUSCH", Aug. 2015 (Year: 2015).*

3GPP TS 36.213 V8.8.0; 3rd Generation Partnership Project; Technical Specification Group Radio Access Network; Evolved Universal Terrestrial Radio Access(E-UTRA); Physical layer procedures(Release 8); Sep. 30, 2009, 77 pages.

"LTE; Evolved Universal Terrestrial Radio Access (E-UTRA); Physical layer procedures (3GPP TS 36.213 version 13.1.1 Release 13)". Technical Specification, European Telecommunications Standards Institute (ETSI), 650, Route Des Lucioles ; F-06921 Sophia-Antipolis ; France, vol. 3GPP RAN 1, No. V13.1.1, on May 1, 2016, XP014275277, paragraphs [7.3.4]-[9 . 1.3], 391 pages.

Samsung, "PHICH Functionality for Low Cost UEs", 3GPP TSG RAN WG1 #82, R1-154098, Beijing, China, Aug. 24-28, 2015.

* cited by examiner

TRANSMISSION METHOD AND APPARATUS FOR FEEDBACK INFORMATION OF UPLINK TRANSMISSION

This application is a National Stage of International Application No. PCT/CN2017/076196, filed Mar. 9, 2017, which claims the priority of Chinese Patent Application No. 201610671985.X, filed with the Chinese Patent Office on Aug. 15, 2016, and entitled "A method and device for transmitting feedback information of uplink transmission", Chinese Patent Application No. 201610641360.9, filed with the Chinese Patent Office on Aug. 5, 2016, and entitled "A method and device for transmitting feedback information of uplink transmission", and Chinese Patent Application No. 201610460911.1, filed with the Chinese Patent Office on Jun. 22, 2016, and entitled "A method and device for transmitting feedback information of uplink transmission", all of which are hereby incorporated by reference in their entireties.

FIELD

The present invention relates to the field of communications, and particularly to a method and device for transmitting feedback information of uplink transmission.

BACKGROUND

FIG. 1 illustrates the Frame Structure Type 2 (FS2) applicable to the existing Long Term Evolution (LTE) Time Division Duplex (TDD) system. In the TDD system, there are different subframes or timeslots, at the same frequency, for uplink and downlink transmission. In the FS2, each 10 ms radio frame includes two 5 ms half-frames, and each half-frame includes five 1 ms subframes. The subframes in the FS2 are categorized into three categories: downlink subframes, uplink subframes, and special subframes, and each special subframe includes three components of a Downlink Pilot Time Slot (DwPTS), a Guard Period (GP), and an Uplink Pilot Time Slot (UpPTS). Table 1 depicts seven uplink-downlink subframe configurations supported in the FS2.

TABLE 1

| Uplink-downlink subframe configuration | | | | | | | | | | | |
|---|---|---|---|---|---|---|---|---|---|---|---|
| Uplink-downlink configuration | Downlink-to-Uplink switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Ten special subframe configurations as depicted in Table 2 have been supported in the LTE Release 13 (Rel-13), and in each configuration, the lengths of symbols in a DwPTS and an UpPTS are specified, and the length of a GP can be determined as the difference between the total number of symbols in a subframe, and the lengths of symbols in the DwPTS and the UpPTS.

TABLE 2

| Special subframe configuration | | | | | | |
|---|---|---|---|---|---|---|
| | Normal cyclic prefix in the downlink | | | Extended cyclic prefix in the downlink | | |
| | | UpPTS | | | UpPTS | |
| Special subframe configuration | DwPTS | Normal cyclic prefix in the uplink | Extended cyclic prefix in the uplink | DwPTS | Normal cyclic prefix in the uplink | Extended cyclic prefix in the uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In Table 2, X is a value configured in higher-layer signaling to additionally extend the length of the UpPTS, where X=2 or 4 symbols are supported at present, so that a part of the GP is allotted for the UpPTS. A downlink pilot, downlink traffic data (e.g., a downlink shared channel), and downlink control signaling (e.g., a downlink control channel) can be transmitted in the DwPTS, no signal is transmitted in the GP, and only a random access and a Sounding Reference Symbol (SRS), but neither uplink traffic (e.g., an uplink shared channel) nor uplink control information (e.g., an uplink control channel) can be transmitted in the UpPTS.

In the existing LTE TDD system, a Physical Uplink Shared Channel (PUSH) is only transmitted in an uplink subframe, and ACK/NACK feedback information thereof can be carried and transmitted in a Physical Hybrid-Automatic Repeat Request (HARQ) Indicator Channel (PHICH), or can be obtained from a downlink control channel carrying an uplink (UL) grant (i.e., a downlink control channel with an uplink Downlink Control Information (DCI) format), where the downlink control channel includes a New Data Indicator (NDI), and if the NDI is inverted or not, then there will be new data or not.

A UE transmitting a PUSCH in an uplink subframe numbered n receives a PHICH in a downlink subframe numbered n+$k_{PHICH}$ to obtain ACK/NACK feedback information of the PUSCH, where $k_{PHICH}$ is defined as depicted in Table 3.

TABLE 3

$k_{PHICH}$ for TDD

| TDD UL-DL configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

The subframes are numbered in Table 3 in the unit of a radio frame, and for a subframe numbered n+k, if n+k is greater than 9, then the subframe will be a subframe in a next radio frame, and this will apply to the following tables.

A PHICH resource of the UE in the subframe detected for a PHICH is determined by ($n_{PHICH}^{group}$, $n_{PHICH}^{seq}$), where $n_{PHICH}^{group}$ is the number of a PHICH group, $n_{PHICH}^{seq}$ is the number of an orthogonal sequence in the group, and $n_{PHICH}^{group}$ and $n_{PHICH}^{seq}$ can be determined in the equations of:

$$n_{PHICH}^{group} = (I_{PRB\_RA} + n_{DMRS}) \bmod N_{PHICH}^{group} + I_{PHICH} N_{PHICH}^{group}; \text{ and}$$

$$n_{PHICH}^{seq} = (\lfloor I_{PRB\_RA}/N_{PHICH}^{group} \rfloor + n_{DMRS}) \bmod 2N_{SF}^{PHICH};$$

Where $n_{DMRS}$ is a value obtained from Demodulation Reference Signal (DMRS) cyclic shift information indicated in scheduling information of a corresponding PUSCH as depicted in Table 4; $n_{SF}^{PHICH}$ is the length of an orthogonal sequence; $N_{PHICH}^{group}$ is the number of PHICH groups in each subframe as defined in higher-layer signaling, where a PHICH group includes a plurality of PHICHs for carrying ACK/NACK feedback information of different PUSCHs respectively, these PHICHs are transmitted over the same resource, and distinguished from each other using orthogonal sequences, and the real number of PHICH groups in each TDD subframe is $m_i * N_{PHICH}^{group}$, where $m_i$ is a prescribed coefficient corresponding to a TDD subframe number i, d $m_i$ can be 0, 1, and 2 for different TDD subframes in different TDD uplink-downlink configurations as depicted in Table 5, and with $m_i$=0, there is no PHICH resource in the subframe; $I_{PRB\_RA}$ is a value determined according to the lowest Physical Resource Block (PRB) number of the PUSCH corresponding to the PHICH; $I_{PHICH}$ is a value, specified in the standard, related to a TDD uplink-downlink configuration, where for the TDD uplink-downlink configuration 0 or the uplink reference TDD uplink-downlink configuration 0, and n=4 or 9, $I_{PHICH}$=1; otherwise, $I_{PHICH}$=0, and when feedback information of PUSCHs in two subframes is transmitted over the PHICH in the same subframe, a correspondence relationship between a PHICH resource in the subframe, and a PUSCH can be distinguished using this value.

TABLE 4

Mapping between $n_{DMRS}$ and a cyclic shift for a DMRS field in a PDCCH/EPDCCH with an uplink DCI format

| A cyclic shift for a DMRS field in a PDCCH/EPDCCH with an uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

TABLE 5

Factor $m_i$ in the FS2

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | 0 | 0 | 0 | 2 | 1 | 0 | 0 | 0 |
| 1 | 0 | 1 | 0 | 0 | 1 | 0 | 1 | 0 | 0 | 1 |
| 2 | 0 | 0 | 0 | 1 | 0 | 0 | 0 | 0 | 1 | 0 |
| 3 | 1 | 0 | 0 | 0 | 0 | 0 | 0 | 0 | 1 | 1 |
| 4 | 0 | 0 | 0 | 0 | 0 | 0 | 0 | 0 | 1 | 1 |
| 5 | 0 | 0 | 0 | 0 | 0 | 0 | 0 | 0 | 1 | 0 |
| 6 | 1 | 1 | 0 | 0 | 0 | 1 | 1 | 0 | 0 | 1 |

For a carrier in any one of the TDD uplink-downlink configurations 1 to 6, or in an uplink reference configuration which is any one of the TDD uplink-downlink configurations 1 to 6, ACK/NACK feedback information carried in a PHICH received in a downlink subframe numbered n corresponds to a PUSCH transmitted in a subframe n−k, where k is defined as depicted in Table 6; and for a carrier in the TDD uplink-downlink configuration 0, or in an uplink reference configuration which is any one of the TDD uplink-downlink configuration 0. ACK/NACK feedback information carried in a PHICH, corresponding to $I_{PHICH}$=0, received in a downlink subframe numbered n corresponds to a PUSCH transmitted in a subframe n−k, and ACK/NACK feedback information carried in a PHICH, corresponding to $I_{PHICH}$=1, received in the downlink subframe numbered n corresponds to a PUSCH transmitted in a subframe n−6.

TABLE 6 k in the TDD uplink-downlink configurations 0 to 6

| TDD UL-DL configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | | 6 | 4 | | | | 7 | 4 | | 6 |

Furthermore the UE further needs to detect a downlink control channel carrying a UL grant, i.e., a downlink control channel with an uplink DCI format, in the subframe detected for a PHICH. If the downlink control channel is detected, then the UE will determine whether transmission of new data or retransmission of the last PUSCH is scheduled using the downlink control channel, according to whether an NDI indicating field in the downlink control channel is inverted, and for example, if an NDI in a corresponding downlink control channel when a PUSCH is initially transmitted is 0, then if a downlink control channel with an NDI of 0 is received in a subframe detected for a PHICH after the PUSCH is transmitted, then the NDI will have not been inverted, so retransmission of the PUSCH is scheduled using the downlink control channel, if both a PHICH and a downlink control channel is detected in a subframe detected for a PHICH, then reference will be made to information in the downlink control channel, that is, retransmission or not will be determined according to an NDI in the downlink control channel, and if so, then the PUSCH will be retransmitted according to scheduling information indicated in the downlink control channel; and if only a PHICH is received, and the PHICH indicates NACK, then the PUSCH will be retransmitted using the same configuration as initial transmission thereof.

As there is an evolving demand for mobile communication traffic, in order to enable uplink transmission in a TDD special subframe, a new TDD special subframe has been defined as proposed to include a DwPTS of six symbols, a GP of two symbols, and an UpPTS of six symbols, for example; and in the new special subframe configuration, the length of the UpPTS is increased, so that the UE can perform uplink transmission in the UpPTS. However there has been absent so far a solution to transmitting ACK/NACK feedback information of an uplink shared channel transmitted in an UpPTS.

SUMMARY

Embodiments of the invention provide a method and device for transmitting feedback information of uplink transmission so as to address the problem in the prior art that there has been absent a solution to transmitting ACK/NACK feedback information of an uplink shared channel transmitted in an UpPTS.

In a first aspect, a method for receiving feedback information of uplink transmission includes:
transmitting, by a terminal, a Physical Uplink Shared Channel (PUSCH) in a special subframe m, wherein m is an integer;
detecting, by the terminal, a downlink control channel with an uplink Downlink Control Information (DCI) format in a subframe including a downlink transmission resource subsequent to the special subframe m, or in a subframe m+k, wherein k is a positive integer; and
deciding, by the terminal, whether to retransmit the PUSCH transmitted in the special subframe m, according to the downlink control channel.

In a possible implementation, k is defined as follows:
for the Time Division Duplex (TDD) uplink-downlink configuration 0, if m is 1 or 6, then k will be 4, 5, 9, or 10; or
for the TDD uplink-downlink configuration 1, if m is 1 or 6, then k will be 3, 5, 8, or 10; or
for the TDD uplink-downlink configuration 2, if m is 1 or 6, then k will be 2 or 7; or
for the TDD uplink-downlink configuration 3, if m is 1, then k will be 7, 8, or 9; or
for the TDD uplink-downlink configuration 4, if m is 1, then k will be 7 or 8; or for the TDD uplink-downlink configuration 5, if m is 1, then k will be 7; or
for the TDD uplink-downlink configuration 6, if m is 1, then k will be 4, 5, 8, 9, or 10; or
for the TDD uplink-downlink configuration 6, if m is 6, then k will be 3, 4, 5, 9, or 10.

Further to any one of the embodiments above, deciding, by the terminal, whether to retransmit the PUSCH transmitted in the special subframe m, according to the downlink control channel includes:
determining, by the terminal, whether the downlink control channel corresponds to a PUSCH transmitted in a special subframe, according to the downlink control channel; and
after it is determined that the downlink control channel corresponds to a PUSCH transmitted in a special subframe, deciding, by the terminal, whether to retransmit the PUSCH transmitted in the special subframe m, according to an indicating field for indicating whether to retransmit the PUSCH, the indicating field is carried in the downlink control channel.

In a possible implementation, determining, by the terminal, whether the downlink control channel corresponds to a PUSCH transmitted in a special subframe, according to the downlink control channel includes:
determining, by the terminal, whether the downlink control channel corresponds to a PUSCH transmitted in a special subframe, according to a size of the uplink DCI format for the downlink control channel; and/or
determining, by the terminal, whether the downlink control channel corresponds to a PUSCH transmitted in a special subframe, according to a first indicating field in the downlink control channel, wherein the first indicating field indicates information about a PUSCH corresponding to the downlink control channel; and/or
determining, by the terminal, whether the downlink control channel corresponds to a PUSCH transmitted in a special subframe, according to a second indicating field in the downlink control channel, wherein the second indicating field indicates whether a PUSCH corresponding to the downlink control channel is a PUSCH transmitted in a special subframe, or a PUSCH in a normal subframe; and/or
determining, by the terminal, whether the downlink control channel corresponds to a PUSCH transmitted in a special subframe, according to a Radio Network Temporary Identifier (RNTI) for scrambling the downlink control channel; and/or
determining, by the terminal, whether the downlink control channel corresponds to a PUSCH transmitted in a special subframe, according to a 2-bit uplink (UL) index indicating field in the downlink control channel.

In a possible implementation, determining, by the terminal, whether the downlink control channel corresponds to a PUSCH transmitted in a special subframe, according to the size of the uplink DCI format for the downlink control channel includes:
if the terminal detects that the uplink DCI format for the downlink control channel has a first DCI size, then determining, by the terminal, that the downlink control channel corresponds to a PUSCH transmitted in a special subframe; or
if the terminal detects that the uplink DCI format for the downlink control channel has a second DCI size, then determining, by the terminal, that the downlink control channel corresponds to a PUSCH transmitted in a normal subframe;

wherein the first DCI size is different from the second DCI size.

In a possible implementation, the first indicating field carries a Hybrid-Automatic Repeat Request (HARQ) process number of the PUSCH corresponding to the downlink control channel.

In a possible implementation, determining, by the terminal, whether the downlink control channel corresponds to a PUSCH transmitted in a special subframe, according to the RNTI for scrambling the downlink control channel includes:
if the terminal detects that the downlink control channel is scrambled using a first RNTI, then determining, by the terminal, that the downlink control channel corresponds to a PUSCH transmitted in a special subframe; or
if the terminal detects that the downlink control channel is scrambled using a second RNTI, then determining, by the terminal, that the downlink control channel corresponds to a PUSCH transmitted in a normal subframe;
wherein the first RNTI is different from the second RNTI.

In a possible implementation, if the first RNTI is shared by a plurality of terminals, then after the terminal determines that the downlink control channel corresponds to a PUSCH transmitted in a special subframe, the method further includes:
determining, by the terminal, a position, of an indicating field for indicating whether to retransmit the PUSCH, corresponding to the terminal, in the downlink control channel according to an index of the terminal.

In a possible implementation, the subframe m+k is different from a subframe detected for a downlink control channel corresponding to a PUSCH transmitted in a normal subframe.
Wherein k is defined as follows:
for the TDD uplink-downlink configuration 1, if m is 1 or 6, then k will be 4 or 9; or
for the TDD uplink-downlink configuration 2, if m is 1 or 6, then k will be 3, 4, 5, 8, 9, or 10; or
for the TDD uplink-downlink configuration 3, if m is 1, then k will be 4, 5, 6, or 10; or
for the TDD uplink-downlink configuration 4, if m is 1, then k will be 3, 4, 5, 6, 9, or 10; or
for the TDD uplink-downlink configuration 5, if m is 1, then k will be 2, 3, 4, 5, 6, 8, 9, or 10.

Furthermore deciding, by the terminal, whether to retransmit the PUSCH transmitted in the special subframe m, according to the downlink control channel includes:
deciding, by the terminal, whether to retransmit the PUSCH transmitted in the special subframe in, according to an indicating field for indicating whether to retransmit the PUSCH, the indicating field is carried in the downlink control channel.

In a possible implementation, determining, by the terminal, whether the downlink control channel corresponds to a PUSCH transmitted in a special subframe, according to the 2-bit uplink (UL) index indicating field in the downlink control channel includes:
when both a Least Significant Bit (LSB) and a Most Significant Bit (MSB) in the UL index are set to 0, determining, by the terminal, that the downlink control channel corresponds to a PUSCH transmitted in a special subframe; and
when at least one of the LSB or the MSB in the UL index is set to 1, determining, by the terminal, that the downlink control channel corresponds to a PUSCH transmitted in a normal uplink subframe.

In a second aspect, a method for transmitting feedback information of uplink transmission includes:
scheduling, by a base station, a terminal to transmit a Physical Uplink Shared Channel (PUSCH) in a special subframe m, wherein m is an integer;
detecting, by the base station, a PUSCH transmitted by the terminal in the special subframe m; and
transmitting, by the base station, a downlink control channel with an uplink Downlink Control Information (DCI) format to the terminal in a subframe including a downlink transmission resource subsequent to the special subframe m, or in a subframe m+k, wherein k is a positive integer, and the downlink control channel carries an indicating field for indicating whether to retransmit the PUSCH transmitted in the special subframe m.

In a possible implementation, k is defined as follows:
for the Time Division Duplex (TDD) uplink-downlink configuration 0, if m is 1 or 6, then k will be 4, 5, 9, or 10; or
for the TDD uplink-downlink configuration 1, if m is 1 or 6, then k will be 3, 5, 8, or 10; or
for the TDD uplink-downlink configuration 2, if m is 1 or 6, then k will be 2 or 7; or
for the TDD uplink-downlink configuration 3, if m is 1, then k will be 7, 8, or 9; or
for the TDD uplink-downlink configuration 4, if m is 1, then k will be 7 or 8; or
for the TDD uplink-downlink configuration 5, if m is 1, then k will be 7; or
for the TDD uplink-downlink configuration 6, if m is 1, then k will be 4, 5, 8, 9, or 10; or
for the TDD uplink-downlink configuration 6, if m is 6, then k will be 3, 4, 5, 9, or 10.

Further to any one of the embodiments above, transmitting, by the base station, the downlink control channel with the uplink DCI format to the terminal includes:
determining, by the base station, a size of the uplink DCI format for the downlink control channel according to whether the downlink control channel corresponds to a PUSCH transmitted in a special subframe; and/or
carrying, by the base station, a first indicating field in the downlink control channel, wherein the first indicating field indicates information about a PUSCH corresponding to the downlink control channel; and/or
carrying, by the base station, a second indicating field in the downlink control channel, wherein the second indicating field indicates whether a PUSCH corresponding to the downlink control channel is a PUSCH transmitted in a special subframe, or a PUSCH in a normal subframe; and/or
determining, by the base station, a Radio Network Temporary Identifier (RNTI) for scrambling the downlink control channel, according to whether the downlink control channel corresponds to a PUSCH transmitted in a special subframe; and/or
determining, by the base station, the value of a 2-bit uplink (UL) index indicating field in the downlink control channel according to whether the downlink control channel corresponds to a PUSCH transmitted in a special subframe.

In a possible implementation, determining, by the base station, the size of the uplink DCI format for the downlink control channel according to whether the downlink control channel corresponds to a PUSCH transmitted in a special subframe includes:

if the downlink control channel corresponds to a PUSCH transmitted in a special subframe, then determining, by the base station, that the uplink DCI format for the downlink control channel has a first DCI size; or if the downlink control channel corresponds to a PUSCH transmitted in a normal subframe, then determining, by the base station, that the uplink DCI format for the downlink control channel has a second DCI size;

wherein the first DCI size is different from the second DCI size.

In a possible implementation, the first indicating field carries an HARQ process number of the PUSCH corresponding to the downlink control channel.

In a possible implementation, determining, by the base station, the RNTI for scrambling the downlink control channel, according to whether the downlink control channel corresponds to a PUSCH transmitted in a special subframe includes:

if the downlink control channel corresponds to a PUSCH transmitted in a special subframe, then determining, by the base station, that the downlink control channel is scrambled using a first RNTI; or if the downlink control channel corresponds to a PUSCH transmitted in a normal subframe, then determining, by the base station, that the downlink control channel is scrambled using a second RNTI;

wherein the first RNTI is different from the second RNTI.

In a possible implementation, if the RNTI corresponding to the special subframe is shared by a plurality of terminals, then the method further includes:

mapping, by the base station, indicating fields for indicating whether to retransmit PUSCHs, of the plurality of terminals to corresponding positions in the downlink control channel corresponding to a special subframe according to indexes of the plurality of terminals.

In a possible implementation, the subframe m+k is different from a subframe detected for a downlink control channel corresponding to a PUSCH transmitted in a normal subframe.

Wherein k is defined as follows:

for the TDD uplink-downlink configuration 1, if m is 1 or 6, then k will be 4 or 9; or for the TDD uplink-downlink configuration 2, if m is 1 or 6, then k will be 3, 4, 5, 8, 9, or 10; or for the TDD uplink-downlink configuration 3, if m is 1, then k will be 4, 5, 6, or 10; or for the TDD uplink-downlink configuration 4, if m is 1, then k will be 3, 4, 5, 6, 9, or 10; or for the TDD uplink-downlink configuration 5, if m is 1, then k will be 2, 3, 4, 5, 6, 8, 9, or 10.

In a possible implementation, determining, by the base station, the value of the 2-bit uplink (UL) index indicating field in the downlink control channel according to whether the downlink control channel corresponds to a PUSCH transmitted in a special subframe includes:

if the downlink control channel corresponds to a PUSCH transmitted in a special subframe, then setting, by the base station, both a Least Significant Bit (LSB) and a Most Significant Bit (MSB) in the UL index to 0; and if the downlink control channel corresponds to a PUSCH transmitted in a normal subframe, then setting, by the base station, at least one of the LSB and the MSB in the UL index to 1.

In a third aspect, there is provided a computer readable storage medium storing therein executable program codes configured to perform the method according to the first aspect.

In a fourth aspect, there is provided a computer readable storage medium therein executable program codes configured to perform the method according to the second aspect.

In a fifth aspect, a terminal includes:

a transmitting module configured to transmit a Physical Uplink Shared Channel (PUSCH) in a special subframe m, wherein m is an integer;

a detecting module configured to detect a downlink control channel with an uplink Downlink Control Information (DCI) format in a subframe including a downlink transmission resource subsequent to the special subframe m, or in a subframe m+k, wherein k is a positive integer; and a determining module configured to decide whether to retransmit the PUSCH transmitted in the special subframe m, according to the downlink control channel.

In a possible implementation, k is defined as follows:

for the Time Division Duplex (TDD) uplink-downlink configuration 0, if m is 1 or 6, then k will be 4, 5, 9, or 10; or for the TDD uplink-downlink configuration 1, if m is 1 or 6, then k will be 3, 5, 8, or 10; or for the TDD uplink-downlink configuration 2, if m is 1 or 6, then k will be 2 or 7; or for the TDD uplink-downlink configuration 3, if m is 1, then k will be 7, 8, or 9; or for the TDD uplink-downlink configuration 4, if m is 1, then k will be 7 or 8; or for the TDD uplink-downlink configuration 5, if m is 1, then k will be 7; or for the TDD uplink-downlink configuration 6, if m is 1, then k will be 4, 5, 8, 9, or 10; or for the TDD uplink-downlink configuration 6, if m is 6, then k will be 3, 4, 5, 9, or 10.

Further to any one of the embodiments above, the determining module is configured:

to determine whether the downlink control channel corresponds to a PUSCH transmitted in a special subframe, according to the downlink control channel; and after it is determined that the downlink control channel corresponds to a PUSCH transmitted in a special subframe, to decide whether to retransmit the PUSCH transmitted in the special subframe m, according to an indicating field for indicating whether to retransmit the PUSCH, the indicating field is carried in the downlink control channel.

In a possible implementation, the determining module is configured:

to determine whether the downlink control channel corresponds to a PUSCH transmitted in a special subframe, according to a size of the uplink DCI format for the downlink control channel; and/or to determine whether the downlink control channel corresponds to a PUSCH transmitted in a special subframe, according to a first indicating field in the downlink control channel, wherein the first indicating field indicates information about a PUSCH corresponding to the downlink control channel; and/or to determine whether the downlink control channel corresponds to a PUSCH transmitted in a special subframe, according to a second indicating field in the downlink control channel, wherein the second indicating field indicates whether a PUSCH corresponding to the downlink control channel is a PUSCH transmitted in a special subframe, or a PUSCH in a normal subframe; and/or to determine whether the downlink control channel corresponds to a PUSCH transmitted in a special subframe, according to a Radio Network Temporary Identifier (RNTI) for scrambling the downlink control channel; and/or to determine whether the downlink control channel corresponds to a PUSCH transmitted in a special subframe, according to a 2-bit uplink (UL) index indicating field in the downlink control channel.

In a possible implementation, the determining module is configured:

if the detecting module detects that the uplink DCI format for the downlink control channel has a first DCI size, to determine that the downlink control channel corresponds to a PUSCH transmitted in a special subframe; or if the detecting module detects that the uplink DCI format for the downlink control channel has a second DCI size, to determine that the downlink control channel corresponds to a PUSCH transmitted in a normal subframe; wherein the first DCI size is different from the second DCI size.

In a possible implementation, the first indicating field carries a Hybrid-Automatic Repeat Request (HARQ) process number of the PUSCH corresponding to the downlink control channel.

In a possible implementation, the determining module is configured:

if the detecting module detects that the downlink control channel is scrambled using a first RNTI, to determine that the downlink control channel corresponds to a PUSCH transmitted in a special subframe; or if the detecting module detects that the downlink control channel is scrambled using a second RNTI, to determine that the downlink control channel corresponds to a PUSCH transmitted in a normal subframe; where the first RNTI is different from the second RNTI.

In a possible implementation, if the first RNTI is shared by a plurality of terminals, then the determining module will be further configured:

to determine a position, of an indicating field for indicating whether to retransmit the PUSCH, corresponding to the terminal, in the downlink control channel according to the index of the terminal.

In a possible implementation, the subframe m+k is different from a subframe detected for a downlink control channel corresponding to a PUSCH transmitted in a normal subframe.

Wherein k is defined as follows:
for the TDD uplink-downlink configuration 1, if m is 1 or 6, then k will be 4 or 9; or
for the TDD uplink-downlink configuration 2, if m is 1 or 6, then k will be 3, 4, 5, 8, 9, or 10; or
for the TDD uplink-downlink configuration 3, if m is 1, then k will be 4, 5, 6, or 10; or
for the TDD uplink-downlink configuration 4, if m is 1, then k will be 3, 4, 5, 6, 9, or 10; or
for the TDD uplink-downlink configuration 5, if m is 1, then k will be 2, 3, 4, 5, 6, 8, 9, or 10.

Furthermore the determining module is configured:
to decide whether to retransmit the PUSCH transmitted in the special subframe m, according to an indicating field, for indicating whether to retransmit the PUSCH, carried in the downlink control channel.

In a possible implementation, the determining module is configured:

when both a Least Significant Bit (LSB) and a Most Significant Bit (MSB) in the UL index are set to 0, to determine that the downlink control channel corresponds to a PUSCH transmitted in a special subframe; and when at least one of the LSB or the MSB in the UL index is set to 1, to determine that the downlink control channel corresponds to a PUSCH transmitted in a normal uplink subframe.

In a sixth aspect, a terminal includes: a transceiver, and at least one processor connected with the transceiver, wherein:

the processor is configured to read and execute program in a memory:

to control the transceiver to transmit a PUSCH in a special subframe m, wherein m is an integer; to detect a downlink control channel with an uplink DCI format in a subframe including a downlink transmission resource subsequent to the special subframe m, or in a subframe m+k, wherein k is a positive integer; and to decide whether to retransmit the PUSCH transmitted in the special subframe m, according to the downlink control channel; and the transceiver is configured to receive and transmit data under the control of the processor.

In a seventh aspect, a base station includes:
a scheduling module configured to schedule a terminal to transmit a Physical Uplink Shared Channel (PUSCH) in a special subframe m, wherein m is an integer:

a detecting module configured to detect a PUSCH transmitted by the terminal in the special subframe m; and a processing module configured to transmit a downlink control channel with an uplink Downlink Control Information (DCI) format to the terminal in a subframe including a downlink transmission resource subsequent to the special subframe m, or in a subframe m+k, wherein k is a positive integer, and the downlink control channel carries an indicating field for indicating whether to retransmit the PUSCH transmitted in the special subframe m.

In a possible implementation, k is defined as follows:
for the Time Division Duplex (TDD) uplink-downlink configuration 0, if m is 1 or 6, then k will be 4, 5, 9, or 10; or
for the TDD uplink-downlink configuration 1, if m is 1 or 6, then k will be 3, 5, 8, or 10; or
for the TDD uplink-downlink configuration 2, if m is 1 or 6, then k will be 2 or 7; or
for the TDD uplink-downlink configuration 3, if m is 1, then k will be 7, 8, or 9; or
for the TDD uplink-downlink configuration 4, if m is 1, then k will be 7 or 8; or
for the TDD uplink-downlink configuration 5, if m is 1, then k will be 7; or
for the TDD uplink-downlink configuration 6, if m is 1, then k will be 4, 5, 8, 9, or 10; or
for the TDD uplink-downlink configuration 6, if m is 6, then k will be 3, 4, 5, 9, or 10.

Further to any one of the embodiments above, the processing module is configured:

to determine a size of the uplink DCI format for the downlink control channel according to whether the downlink control channel corresponds to a PUSCH transmitted in a special subframe; and/or to carry a first indicating field in the downlink control channel, wherein the first indicating field indicates information about a PUSCH corresponding to the downlink control channel; and/or to carry a second indicating field in the downlink control channel, wherein the second indicating field indicates whether a PUSCH corresponding to the downlink control channel is a PUSCH transmitted in a special subframe, or a PUSCH in a normal subframe; and/or to determine a Radio Network Temporary Identifier (RNTI) for scrambling the downlink control channel, according to whether the downlink control channel corresponds to a PUSCH transmitted in a special subframe; and/or to determine the value of a 2-bit uplink (UL) index indicating field in the downlink control channel according to whether the downlink control channel corresponds to a PUSCH transmitted in a special subframe.

In a possible implementation, the processing module is configured:

if the downlink control channel corresponds to a PUSCH transmitted in a special subframe, to determine that the uplink DCI format for the downlink control channel has a first DCI size; or if the downlink control channel corresponds to a PUSCH transmitted in a normal subframe, to determine that the uplink DCI format for the downlink control channel has a second DCI size; wherein the first DCI size is different from the second DCI size.

In a possible implementation, the first indicating field carries an HARQ process number of the PUSCH corresponding to the downlink control channel.

In a possible implementation, the processing module is configured:

if the downlink control channel corresponds to a PUSCH transmitted in a special subframe, to determine that the downlink control channel is scrambled using a first RNTI; or if the downlink control channel corresponds to a PUSCH transmitted in a normal subframe, to determine that the downlink control channel is scrambled using a second RNTI; wherein the first RNTI is different from the second RNTI.

In a possible implementation, if the RNTI corresponding to the special subframe is shared by a plurality of terminals, then the processing module will be further configured:

to map the indicating fields for indicating whether to retransmit PUSCHs, of the plurality of terminals to corresponding positions in the downlink control channel corresponding to a special subframe according to indexes of the plurality of terminals.

In a possible implementation, the subframe m+k is different from a subframe detected for a downlink control channel corresponding to a PUSCH transmitted in a normal subframe.

Wherein k is defined as follows:

for the TDD uplink-downlink configuration 1, if m is 1 or 6, then k will be 4 or 9; or for the TDD uplink-downlink configuration 2, if m is 1 or 6, then k will be 3, 4, 5, 8, 9, or 10; or for the TDD uplink-downlink configuration 3, if m is 1, then k will be 4, 5, 6, or 10; or for the TDD uplink-downlink configuration 4, if m is 1, then k will be 3, 4, 5, 6, 9, or 10; or for the TDD uplink-downlink configuration 5, if m is 1, then k will be 2, 3, 4, 5, 6, 8, 9, or 10.

In a possible implementation, the processing module is configured:

if the downlink control channel corresponds to a PUSCH transmitted in a special subframe, to set both a Least Significant Bit (LSB) and a Most Significant Bit (MSB) in the UL index to 0; and if the downlink control channel corresponds to a PUSCH transmitted in a normal subframe, to set at least one of the LSB and the MSB in the UL index to 1.

In an eighth aspect, a base station includes: a transceiver, and at least one processor connected with the transceiver, wherein:

the processor is configured to read and execute program in a memory:

to schedule a terminal through the transceiver to transmit a Physical Uplink Shared Channel (PUSCH) in a special subframe m, wherein m is an integer; to detect a PUSCH transmitted by the terminal in the special subframe m; and to control the transceiver 510 to transmit a downlink control channel with an uplink DCI format to the terminal in a subframe including a downlink transmission resource subsequent to the special subframe m, or in a subframe m+k, wherein k is a positive integer, and the downlink control channel carries an indicating field for indicating whether to retransmit the PUSCH transmitted in the special subframe m; and the transceiver is configured to receive and transmit data under the control of the processor.

In the methods and devices according to the embodiments of the invention, after the terminal transmits the Physical Uplink Shared Channel (PUSCH) in the special subframe m, the terminal detects a downlink control chancel with an uplink DCI format in a subframe including a downlink transmission resource subsequent to the special subframe m, or in the subframe m+k, and decides whether to retransmit the PUSCH transmitted in the special subframe m, according to the downlink control channel, so that there is provided a solution to transmitting feedback information of a PUSCH in a special subframe so as to enable ACK/NACK feedback information of the PUSCH transmitted in the special subframe to be obtained normally.

DETAILED DESCRIPTION OF THE EMBODIMENTS

Figure 1:
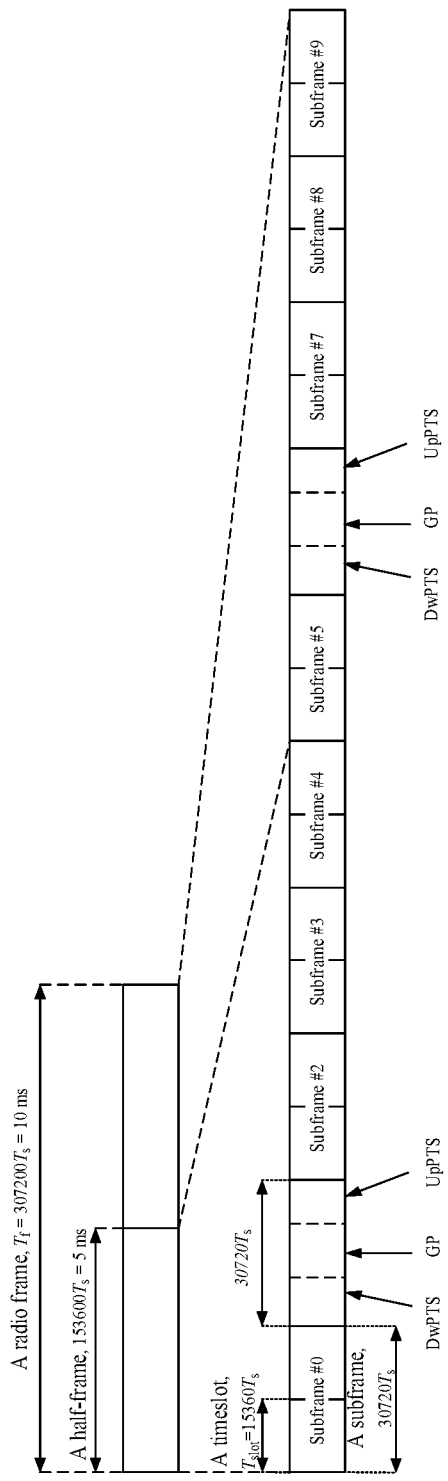
FIG. 1 is a schematic structural diagram of the FS2 in the LTE TDD system.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described are only a part but not all of the embodiments of the invention. Based upon the embodiments here of the invention, all the other embodiments which can occur to those ordinarily skilled in the art without any inventive effort shall fall into the claimed scope of the invention.

The technical solutions according to the embodiments of the invention can be applicable to various communication systems, e.g., 2G, 3G, 4G, and 5G communication systems, and next-generation communication systems, e.g., a Global System for Mobile communication (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a Single Carrier-FDMA (SC-FDMA) system, a General Packet Radio Service (GPRS) system, Long Term Evolution (LTE) system, etc.

The embodiments of the invention will be described for a terminal and/or a base station.

The terminal can be a wireless terminal, and the wireless terminal can refer to a device providing a user with voice and/or data connectivity, a handheld device with a wireless connection function, or another processing device connected with a wireless modulator-demodulator. The wireless terminal can communicate with one or more core networks over a Radio Access Network (RAN), and the wireless terminal can be a mobile terminal, e.g., a mobile phone (referred to as a "cellular" phone), and a computer with a mobile terminal, e.g., a portable, pocket, handheld, built-in-computer, or on-vehicle mobile device, which exchange voice and/or data with the radio access network. e.g., a Personal Communication Service (PCS) phone, a cordless phone, a Session Initiation Protocol (SIP) phone, a Wireless Local Loop (WLL) station, a Personal Digital Assistant (PDA), etc. The wireless terminal can also be referred to as a system, a subscriber unit, a subscriber station, a mobile station, a mobile, a remote station, an access point, a remote terminal, an access terminal, a user terminal, a user agent, a user device, or a user equipment.

The base station can refer to such a device in the access network that communicates with the wireless terminal over one or more sectors via an air interface. The base station can be configured to convert a received air frame into an IP packet, and a received IP packet into an air frame, and operate as a router between the wireless terminal, and the remaining components of the access network, where the remaining components of the access network can include an Internet Protocol (IP) network. The base station can further coordinate attribute management on the air interface. For example, the base station can be a Base Transceiver Station (BTS) in the GSM or CDMA system, or a Node B in the WCDMA system, or an evolved Node B (eNB) in the LTE system, although the embodiments of the invention will not be limited thereto.

The embodiments of the invention will be described below in further details with reference to the drawings. It shall be appreciated that the embodiments described here are only intended to illustrate and explain the invention, but not to limit the invention thereto.

Figure 2:
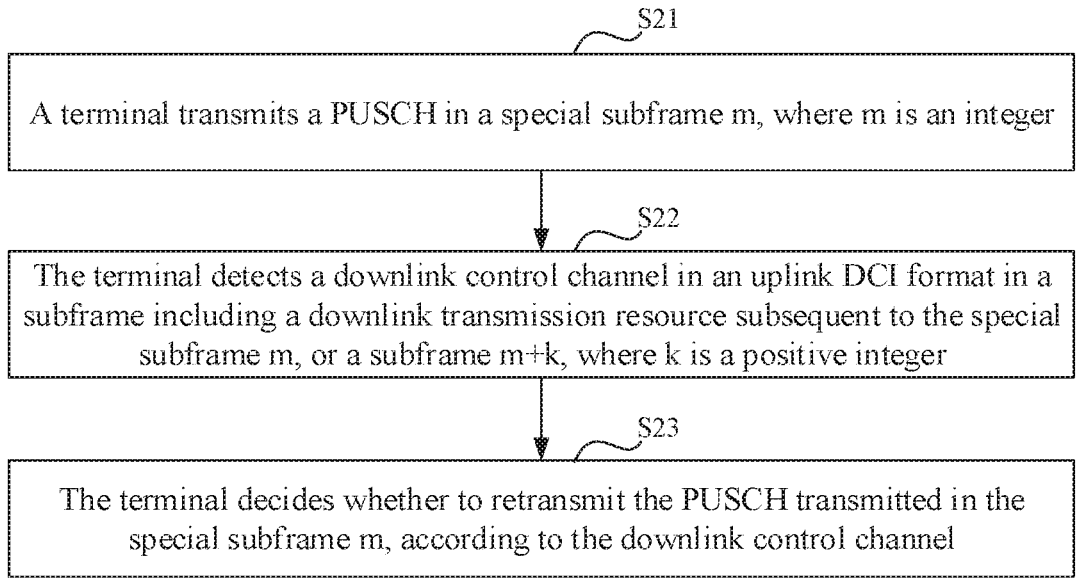
FIG. 2 is a schematic flow chart of a method for receiving feedback information of uplink transmission according to an embodiment of the invention.

FIG. 2 illustrates a method for receiving feedback information of uplink transmission according to an embodiment of the invention, and the method includes the following steps.

In the step S21, a terminal transmits a PUSCH in a special subframe m, where m is an integer.

Optionally, m=1 or 6.

Optionally, the terminal transmits the PUSCH in an UpPTS in the special subframe m. Of course, the terminal can alternatively transmit the PUSCH in a GP in the special subframe m, and the embodiment of the invention will not be limited to any particular position at which the PUSCH is transmitted.

In the step S22, the terminal detects a downlink control channel with an uplink DCI format in a subframe including a downlink transmission resource subsequent to the special subframe m, or in a subframe m+k, where k is a positive integer.

In this step, if an HARQ of the PUSCH transmitted by the terminal is asynchronous, then the terminal will detect in a subframe including a downlink transmission resource subsequent to the special subframe m; and if an HARQ of the PUSCH transmitted by the terminal is synchronous, then the terminal will detect in the subframe m+k.

Optionally, when the terminal detects a downlink control channel with an uplink DCI format in a subframe including a downlink transmission resource subsequent to the special subframe m, the terminal can detect in any one subframe including a downlink transmission resource subsequent to the special subframe m, or can detect in any one subframe including a downlink transmission resource in a preset period of time subsequent to the special subframe m, e.g., any one downlink subframe and/or special subframe among ten subframes subsequent to the special subframe m, dependent upon how a base station schedules the terminal and allocates a resource.

In the step S23, the terminal decides whether to retransmit the PUSCH transmitted in the special subframe m, according to the downlink control channel.

In the embodiment of the invention, after the terminal transmits the Physical Uplink Shared Channel (PUSCH) in the special subframe m, the terminal detects a downlink control chancel in an uplink DCI format in a subframe including a downlink transmission resource subsequent to the special subframe m, or in the subframe m+k, and decides whether to retransmit the PUSCH transmitted in the special subframe m, according to the downlink control channel, so that there is provided a solution to transmitting feedback information of a PUSCH in a special subframe so as to enable ACK/NACK feedback information of the PUSCH transmitted in the special subframe to be obtained normally.

In the embodiment of the invention, no matter whether an HARQ of the PUSCH transmitted by the terminal is synchronous or asynchronous, the terminal can decide whether to retransmit the PUSCH transmitted in the special subframe m, according to the downlink control channel in the step S23 as follows:

The terminal determines whether the downlink control channel corresponds to the PSUCH transmitted in the special subframe, according to the downlink control channel; and The terminal decides whether to retransmit the PUSCH transmitted in the special subframe m, according to an indicating field carried in the downlink control channel for indicating whether to retransmit the PUSCH, upon determining that the downlink control channel corresponds to the PSUCH transmitted in the special subframe.

Furthermore, the terminal determines whether the downlink control channel corresponds to the PSUCH transmitted in the special subframe, according to the downlink control channel in the following five possible schemes.

In a first scheme, the terminal determines whether the downlink control channel corresponds to the PSUCH transmitted in the special subframe, according to the size of the uplink DCI format for the downlink control channel.

In this scheme, the size of the uplink DCI format for the downlink control channel corresponding to the PUSCH transmitted in the special subframe (referred to as a first DCI size) is different from the size of an uplink DCI format for a downlink control channel corresponding to a PUSCH transmitted in a normal subframe (referred to as a second DCI size) to thereby indicate whether the detected downlink control channel corresponds to the PUSCH transmitted in the special subframe (in an implementation, for the terminal supporting transmission of a PUSCH in an UpPTS, an uplink DCI format corresponding to an UpPTS is a newly defined uplink DCI format, or an uplink DCI format obtained by adding an additional bit field to an existing DCI format, and an uplink DCI format corresponding to a normal uplink subframe is an existing uplink DCI format, where the existing uplink DCI format can be the DCI format 0/4 defined in the 3GPP 36.212 Rel-13 and the earlier releases).

In this scheme, the terminal can detect uplink DCI formats with different sizes blindly to determine whether the detected downlink control channel corresponds to the PUSCH in the special subframe, or a PUSCH in a normal subframe.

In this scheme, if the terminal detects an uplink DCI format with the first DCI size for the downlink control channel, then the terminal will determine that the downlink control channel corresponds to a PUSCH transmitted in a special subframe; or if the terminal detects an uplink DCI format with the second DCI size for the downlink control channel, then the terminal will determine that the downlink control channel corresponds to a PUSCH transmitted in a normal subframe.

In a second scheme, the terminal determines whether the downlink control channel corresponds to a PUSCH transmitted in a special subframe, according to a first indicating field in the downlink control channel, where the first indicating field indicates information about a PUSCH corresponding to the downlink control channel.

Optionally, the first indicating field carries an HARQ process number of the PUSCH corresponding to the downlink control channel. The HARQ process number can be a common number of a PUSCH in an UpPTS, and a PUSCH in a normal subframe, or a PUSCH in an UpPTS, and a PUSCH in a normal subframe can be numbered separately. Of course, the embodiment of the invention will not be limited to any particular implementation of the first indicating field as long as the first indicating field can be any information which can identify the PUSCH corresponding to the downlink control channel.

In an implementation, for the terminal supporting transmission of a PUSCH in an UpPTS, an uplink DCI format corresponding to an UpPTS is a newly defined uplink DCI format, or an uplink DCI format obtained by adding an additional bit field to an existing DCI format, where the first indicating field indicates the process number and other information of the PUSCH transmitted in the UpPTS, and the process number identifies the UpPTS in which the PUSCH is transmitted; and an uplink DCI format corresponding to a normal uplink subframe is an existing uplink DCI format, where the existing uplink DCI format can be the DCI format 0/4 defined in the 3GPP 36.212 Rel-13 and the earlier releases.

In another implementation, for the terminal supporting transmission of a PUSCH in an UpPTS, padding bits in the existing uplink DCI format are reused as the first indicating field, that is, at this time, for the terminal supporting transmission of a PUSCH in an UpPTS, an uplink DCI format corresponding to an UpPTS is the same as, and has the same size, as an uplink DCI format of a normal uplink subframe, and the terminal can parse padding bits therein as the first indicating field to know whether the uplink DCI format corresponds to an UpPTS or a normal uplink subframe, and a specific UpPTS, including a PUSCH, to which it corresponds. For example, the first indicating field indicates a common HARQ process number of a PUSCH in an UpPTS, and a PUSCH in a normal subframe. It can be further defined that the first indicating field which is all-zero indicates that the uplink DCI format corresponds to a normal uplink subframe, and the first indicating field which is not all-zero indicates that the uplink DCI format corresponds to a specific UpPTS in which a PUSCH is transmitted. Of course, the first indicating field can alternatively be defined otherwise.

In another implementation, an uplink DCI format A is defined for the terminal supporting transmission of a PUSCH in an UpPTS, and the uplink DCI format A can be an existing uplink DCI format to which an additional indicating field is added. For example, an additional indicating field is added to the DCI format 0/4 as the first indicating field, and the indicating field only applies to the terminal supporting transmission of a PUSCH in an UpPTS. Alternatively the uplink DCI format A can be a totally redefined uplink DCI format, where the first indicating field indicates a common HARQ process number of a PUSCH in an UpPTS, and a PUSCH in a normal subframe, or the first indicating field in one state indicates that the uplink DCI format corresponds to a normal uplink subframe, and the indicating field in the other states indicates that the uplink DCI format corresponds to a specific UpPTS in which a PUSCH is transmitted. For the terminal supporting transmission of a PUSCH in an UpPTS, both a PUSCH transmitted in an UpPTS, and a PUSCH transmitted in a normal uplink subframe are scheduled using the uplink DCI format A, and it can be further defined that for the terminal supporting transmission of a PUSCH in an UpPTS, a part or all of downlink DCI formats thereof can be padded according to the size of the uplink DCI format A, or the uplink DCI format A can be padded according to the size of a part or all of downlink DCI formats thereof, so that the size of the uplink DCI format A is the same as the size of a part or all of the downlink DCI formats, so the number of blind detections of DCI by the terminal will not be increased. For example, for the terminal supporting transmission of a PUSCH in an UpPTS, an uplink DCI format thereof is defined based upon the existing DCI format 0, and at least an additional bit indicating field is added to the existing DCI format 0 as the first indicating field. Of course, another indicating field(s) may be further added, and the uplink DCI format 0 to which the indicating field(s) is or added is the uplink DCI format 0 corresponding to the terminal supporting transmission of a PUSCH in an UpPTS. Since the uplink DCI format 0 was originally designed to be of the same size as the downlink DCI format 1A to thereby reduce the number of blind detections, in order to maintain the original number of blind detections, when the size of the uplink DCI format 0 corresponding to the terminal supporting transmission of a PUSCH in an UpPTS is less than that of the downlink DCI format 1A, the DCI format 0 corresponding to the terminal supporting transmission of a PUSCH in an UpPTS shall be padded (that is, 0('s) is or are padded at the end thereof) so that the DCI size thereof is the same as that of the corresponding downlink DCI format 1A thereof; and when the size of the downlink DCI format 1A corresponding to the terminal supporting transmission of a PUSCH in an UpPTS is less than that of the uplink DCI format 0 thereof, the DCI format 1A corresponding to the terminal supporting transmission of a PUSCH in an UpPTS shall be padded so that the DCI size thereof is the same as that of the corresponding uplink DCI format 0 thereof, where an existing downlink DCI format can be reused directly as a downlink DCI format corresponding to the terminal supporting transmission of a PUSCH in an UpPTS, e.g., the DCI format 1A, or another downlink DCI format, e.g., the DCI format 1B/1C/1D/2/2A/2B, and in order to maintain the number of blind detections, the sizes of the downlink DCI formats 3 and 3A corresponding to the terminal supporting transmission of a PUSCH in an UpPTS are the same as the sizes of the uplink DCI format 0 and the downlink DCI format 1A corresponding to the terminal supporting transmission of a PUSCH in an UpPTS.

In a third scheme, the terminal determines whether the downlink control channel corresponds to a PUSCH transmitted in a special subframe, according to a second indicating field in the downlink control channel, where the second indicating field indicates whether a PUSCH corresponding to the downlink control channel is a PUSCH transmitted in a special subframe, or a PUSCH in a normal subframe.

In this scheme, the second indicating field can be a bit field newly defined in the downlink control channel, or an idle one-bit field, e.g., a padding bit, etc., in an existing uplink DCI format can be reused as the second indicating field. The idle one-bit field in the existing uplink DCI format is reused so that the size of an uplink DCI format corresponding to a special subframe is the same as the size of an uplink DCI format corresponding to a normal subframe so that the number of blind detections for uplink DCI formats by the terminal can be reduced.

In this scheme, the second indicating field is represented as one-bit information. For example, when the second indicating field is "0", it indicates that the downlink control channel corresponds to a PUSCH transmitted in a special subframe, and the second indicating field is "1", it indicates that the downlink control channel corresponds to a PUSCH transmitted in a normal subframe; or vice versa.

In an implementation, for the terminal supporting transmission of a PUSCH in an UpPTS, padding bits in the existing uplink DCI format are reused as the second indicating field, that is, at this time, for the terminal supporting transmission of a PUSCH in an UpPTS, an uplink DCI format corresponding to an UpPTS is the same as, and has the same size, as an uplink DCI format of a normal uplink subframe, and the terminal can parse padding bits therein as the second indicating field to know whether the uplink DCI format corresponds to an UpPTS or a normal uplink subframe, and a specific UpPTS, including a PUSCH, to which it corresponds, where it can be defined that the second indicating field which is all-zero indicates that the uplink DCI format corresponds to a normal uplink subframe, and the second indicating field which is not all-zero indicates that the uplink DCI format corresponds a specific UpPTS in which a PUSCH is transmitted. Of course, the second indicating field can alternatively be defined otherwise.

In another implementation, an uplink DCI format A is defined for the terminal supporting transmission of a PUSCH in an UpPTS, and the uplink DCI format A can be an existing uplink DCI format to which an additional indicating field is added. For example, an additional indicating field is added to the DCI format 0/4 as the second indicating field, and the indicating field only applies to the terminal supporting transmission of a PUSCH in an UpPTS. Alternatively the uplink DCI format A can be a totally redefined uplink DCI format, where the second indicating field can include only one bit, so the second indicating field in one state indicates that the uplink DCI format corresponds to a normal uplink subframe, and the second indicating field in the other state indicates that the uplink DCI format corresponds to an UpPTS. If there are a plurality of UpPTS's including PUSCHs, then the second indicating field may include more than one bit, so the second indicating field in one state indicates that the uplink DCI format corresponds to a normal uplink subframe, and the second indicating field in the other state indicates that the uplink DCI format corresponds to a specific UpPTS in which a PUSCH is transmitted, e.g., a process number, etc. For the terminal supporting transmission of a PUSCH in an UpPTS, both a PUSCH transmitted in an UpPTS, and a PUSCH transmitted in a normal uplink subframe are scheduled using the uplink DCI format A, and it can be further defined that for the terminal supporting transmission of a PUSCH in an UpPTS, a part or all of downlink DCI formats thereof can be padded according to the size of the uplink DCI format A. or the uplink DCI format A can be padded according to the size of a part or all of downlink DCI formats thereof, so that the size of the uplink DCI format A is the same as the size of a part or all of the downlink DCI formats, so the number of blind detections of DCI by the terminal will not be increased. For example, for the terminal supporting transmission of a PUSCH in an UpPTS, an uplink DCI format thereof is defined based upon the existing DCI format 0, and at least an additional bit indicating field is added to the existing DCI format 0 as the second indicating field. Of course, another indicating field(s) may be further added, and the uplink DCI format 0 to which the indicating field(s) is or added is the uplink DCI format 0 corresponding to the terminal supporting transmission of a PUSCH in an UpPTS. Since the uplink DCI format 0 was originally designed to be of the same size as the downlink DCI format 1A to thereby reduce the number of blind detections, in order to maintain the original number of blind detections, when the size of the uplink DCI format 0 corresponding to the terminal supporting transmission of a PUSCH in an UpPTS is less than that of the downlink DCI format 1A, the DCI format 0 corresponding to the terminal supporting transmission of a PUSCH in an UpPTS shall be padded (that is, 0('s) is or are padded at the end thereof) so that the DCI size thereof is the same as that of the corresponding downlink DCI format 1A thereof; and when the size of the downlink DCI format 1A corresponding to the terminal supporting transmission of a PUSCH in an UpPTS is less than that of the uplink DCI format 0 thereof, the DCI format 1A corresponding to the terminal supporting transmission of a PUSCH in an UpPTS shall be padded so that the DCI size thereof is the same as that of the corresponding uplink DCI format 0 thereof, where an existing downlink DCI format can be reused directly as a downlink DCI format corresponding to the terminal supporting transmission of a PUSCH in an UpPTS, e.g., the DCI format 1A, or another downlink DCI format, e.g., the DCI format 1B/1C/1D/2/2A/2B, and in order to maintain the number of blind detections, the sizes of the downlink DCI formats 3 and 3A corresponding to the terminal supporting transmission of a PUSCH in an UpPTS are the same as the sizes of the uplink DCI format 0 and the downlink DCI format 1A corresponding to the terminal supporting transmission of a PUSCH in an UpPTS.

In a fourth scheme, the terminal determines whether the downlink control channel corresponds to a PUSCH transmitted in a special subframe, according to a Radio Network Temporary Identifier (RNTI) for scrambling the downlink control channel; and in an implementation, the terminal supporting transmission of a PUSCH in an UpPTS schedules a PUSCH transmitted in an UpPTS, and a PUSCH transmitted in a normal uplink subframe using the same uplink DCI format, and for example, an existing uplink DCI format can be reused, or an uplink DCI format can be newly defined. Of course, different DCI formats can alternatively be used.

In this scheme, an RNTI for scrambling the downlink control channel corresponding to the PUSCH transmitted in the special subframe (referred to as a first RNTI) is different from an RNTI for scrambling a downlink control channel corresponding to a PUSCH transmitted in a normal subframe (referred to as a second RNTI) to thereby indicate whether the detected downlink control channel corresponds to the PUSCH transmitted in the special subframe.

In this scheme, the terminal can detect blindly using the first RNTI and the second RNTI to determine whether the detected downlink control channel corresponds to the PUSCH in the special subframe, or a PUSCH in a normal subframe.

In this scheme, if the terminal detects that the downlink control channel is scrambled using the first RNTI, then the terminal will determine that the downlink control channel corresponds to a PUSCH transmitted in a special subframe; or if the terminal detects that the downlink control channel is scrambled using the second RNTI, then the terminal will determine that the downlink control channel corresponds to a PUSCH transmitted in a normal subframe.

In this scheme, optionally if the first RNTI is shared by a plurality of terminals, then after the terminal determines that the downlink control channel corresponds to a PUSCH transmitted in a special subframe, the method further includes:

the terminal determines the position, of an indicating field for indicating whether to retransmit the PUSCH, corresponding to the terminal, in the downlink control channel according to the index of the terminal.

Particularly, if the first RNTI is specific to the terminal, then at this time, the downlink control channel scrambled using the first RNTI will carry only one indicating field for indicating whether to retransmit the PUSCH, of the terminal transmitting the PUSCH in the special subframe; and if the first RNTI is shared by a plurality of terminals, then at this time, the downlink control channel scrambled using the first RNTI will carry a plurality of indicating fields for indicating whether to retransmit the PUSCHs, of the terminals transmitting the PUSCHs in the special subframe, so each terminal can be configured with an index for identifying the position, of the indicating field for indicating whether to retransmit the PUSCH, in the downlink control channel.

In a fifth scheme, the terminal determines whether the downlink control channel corresponds to a PUSCH transmitted in a special subframe, according to an uplink (UL) index indicating field in the downlink control channel.

In this scheme, when both a Least Significant Bit (LSB) and a Most Significant Bit (MSB) in the UL index are set to 0, the terminal determines that the downlink control channel corresponds to a PUSCH transmitted in a special subframe, and when at least one of the LSB or the MSB in the UL index is set to 1, the terminal determines that the downlink control channel corresponds to a PUSCH transmitted in a normal uplink subframe.

In an implementation, for the TDD uplink-downlink configuration 0, a 2-bit uplink (UL) index field in an existing uplink DCI format can be used to determine whether the downlink control channel with the uplink DCI format corresponds to a PUSCH in a normal uplink subframe, or the PUSCH in the special subframe.

Particularly, when both of the bits in the UL index are 0, that is, both the LSB and the MSB are set to 0, it indicates that the downlink control channel corresponds to a PUSCH transmitted in a special subframe; and when at least one bit of the LSB or the MSB is 1, it indicates that the downlink control channel corresponds to a PUSCH transmitted in a normal uplink subframe.

In this implementation, the temporal position for detecting a downlink control channel can be defined as per m+k, and for example, for a PUSCH in a special subframe, the value of k in the TDD uplink-downlink configuration 0 is defined as depicted in Table 7. Optionally, k=4 or 5 or 9 or 10 with m=1 or 6. For a PUSCH in a normal uplink subframe, k is defined as depicted in Table 3. When the terminal transmits a PUSCH in a special subframe 1, the terminal can detect a subframe m+k for a downlink control channel, where m is the number of the special subframe, and the terminal can decide whether to retransmit the PUSCH in the special subframe 1, according to an NDI in the downlink control channel. For example, with k=5, the terminal detects a subframe 6 for a downlink control channel, and decides whether to retransmit the PUSCH in the special subframe 1, according to an NDI in the downlink control channel. When the terminal transmits a PUSCH in an uplink subframe 2, the terminal can detect a subframe n+k for a downlink control channel and/or a PHICH, and when a downlink control channel is detected, the terminal can decide whether to retransmit the PUSCH in the special subframe 1, according to an NDI in the downlink control channel. As depicted in Table 3, k=4 with n=2, so the terminal detects the subframe 6 for a downlink control channel or a PHICH, and decides whether to retransmit the PUSCH in the uplink subframe 2, according to an NDI in the downlink control channel, or feedback information carried in the PHICH. At this time, the subframe 6 is detected for a downlink control channel, for both of the PUSCHs in the special subframe 1 and the uplink subframe 2, and when an uplink DCI format of the terminal corresponding to a special subframe is the same as, or has the same size as, an uplink DCI format of the terminal corresponding to a normal uplink subframe, the terminal detects the subframe 6 for a downlink control channel, and determines whether a downlink control channel detected in the subframe 6 corresponds to the PUSCH in the special subframe 1, or the PUSCH in the uplink subframe 2, according to an UL index field in the downlink control channel, that is, when both an LSB and an MSB in the UL index field are set to 0, the terminal determines that the downlink control channel corresponds to the PUSCH in the special subframe 1, and decided whether to retransmit the PUSCH, according to an NDI; and when either of the LSB and the MSB in the UL index field is 1, the terminal determines that the downlink control channel corresponds to the PUSCH in the uplink subframe 2, and decided whether to retransmit the PUSCH, according to an NDI.

Of course, an HARQ process number indicating field can be further carried in the uplink DCI format, and a number of existing bits in an existing uplink DCI format can be reused as the indicating field to indicate a PUSCH process number in a special subframe, or to indicate a PUSCH process number in a special subframe and a normal subframe.

Optionally, the indicating field for indicating whether to retransmit the PUSCH is an NDI.

All of the first to fifth schemes above can be applicable to an asynchronous HARQ and a synchronous HARQ of the PUSCH transmitted by the terminal.

The first to fifth schemes above can be applied separately or in combination, although the embodiment of the invention will not be limited thereto.

In the embodiment of the invention, if the terminal detects the subframe m+k for a downlink control channel with an uplink DCI format, that is, an HARQ of the PUSCH transmitted by the terminal is synchronous, and in a possible implementation, a subframe detected for a downlink control channel corresponding to the PUSCH transmitted in the special subframe is the same as a subframe detected for a downlink control channel corresponding to a PUSCH transmitted in a normal subframe, and k is defined as follows:

for the TDD uplink-downlink configuration 0, if m is 1 or 6, then k will be 4, 5, 9, or 10; or
for the TDD uplink-downlink configuration 1, if m is 1 or 6, then k will be 3, 5, 8, or 10; or
for the TDD uplink-downlink configuration 2, if m is 1 or 6, then k will be 2 or 7; or
for the TDD uplink-downlink configuration 3, if m is 1, then k will be 7, 8, or 9; or
for the TDD uplink-downlink configuration 4, if m is 1, then k will be 7 or 8; or
for the TDD uplink-downlink configuration 5, if m is 1, then k will be 7; or
for the TDD uplink-downlink configuration 6, if m is 1, then k will be 4, 5, 8, 9, or 10; or
for the TDD uplink-downlink configuration 6, if m is 6, then k will be 3, 4, 5, 9, or 10.

Since the subframe detected for a downlink control channel corresponding to the PUSCH transmitted in the special subframe is the same as the subframe detected for a downlink control channel corresponding to a PUSCH transmitted in a normal subframe, k is defined as described above so that downlink control channels with an uplink DCI format corresponding to the special subframe and the normal subframe lie in the same subframe, so after the terminal detects an uplink control channel with an uplink DCI format in the subframe m+k, the terminal needs to firstly determine whether the downlink control channel corresponds to a PUSCH transmitted in a special subframe, and upon determining that the downlink control channel corresponds to a PUSCH transmitted in a special subframe, the terminal further decides whether to retransmit the PUSCH transmitted in the special subframe m, according to an indicating field, for indicating whether to retransmit the PUSCH, carried in the downlink control channel, where whether the downlink control channel corresponds to the PUSCH transmitted in the special subframe can be determined in any one or combination of the first to fifth schemes above.

Further to any one of the embodiments above, the terminal decides whether to retransmit the PUSCH transmitted in the special subframe m, according to the downlink control channel in the step S23 particularly as follows.

1. The terminal detects a subframe including a downlink resource subsequent to the special subframe m further in the following two instances.

1) If the terminal detects in any one subframe including a downlink resource subsequent to the special subframe m, that is, no preset period of time is defined, then the terminal will reserve information about the PUSCH transmitted in the special subframe m until the terminal receives such a downlink control channel with an uplink DCI format that it can decide whether to retransmit the PUSCH, i.e., a downlink control channel corresponding to a PUSCH transmitted in a special subframe, and with an uplink DCI format. Furthermore the terminal decides whether to retransmit the PUSCH transmitted in the special subframe m, according to an indicating field, for indicating whether to retransmit the PUSCH, carried in the downlink control channel.

2) if the terminal detects in any one subframe including a downlink resource in a preset period of time subsequent to the special subframe, that is, a preset period of time is defined, then:

if the terminal has not detected any downlink control channel with an uplink DCI format in the preset period of time, or although the terminal detects a downlink control channel with an uplink DCI format in the preset period of time, but the downlink control channel corresponds to a PUSCH transmitted in a normal subframe, then the terminal will determine that the PUSCH transmitted in the special subframe m has been transmitted successfully, and will not be retransmitted; and if the terminal detects a downlink control channel with an uplink DCI format in the preset period of time, and the downlink control channel corresponds to a PUSCH transmitted in a special subframe, then the terminal will decide whether to retransmit the PUSCH transmitted in the special subframe m, according to an indicating field, for indicating whether to retransmit the PUSCH, carried in the downlink control channel.

2. The terminal detects in the subframe m+k further in the following instances.

1) If the terminal detects a downlink control channel with an uplink DCI format in the subframe m+k, and the downlink control channel corresponds to a PUSCH transmitted in a special subframe, then the terminal will decide whether to retransmit the PUSCH transmitted in the special subframe, according to an indicating field, for indicating whether to retransmit the PUSCH, carried in the downlink control channel.

2) If the terminal does not detect any downlink control channel with an uplink DCI format in the subframe m+k, or although the terminal detects a downlink control channel with an uplink DCI format, but the downlink control channel corresponds to a PUSCH transmitted in a normal subframe, then the terminal will determine that the PUSCH transmitted in the special subframe m has been transmitted successfully, and will not be retransmitted.

Optionally, the indicating field for indicating whether to retransmit the PUSCH is an NDI, that is, the terminal decides whether to retransmit the PUSCH transmitted in the special subframe, according to the NDI carried in the downlink control channel.

Particularly, for dynamic scheduling, where each transmission has a PUSCH of a corresponding downlink control channel: if an NDI in the downlink control channel is not changed from an NDI corresponding to initial transmission of the PUSCH, the terminal will retransmit the PUSCH; and if the NDI in the downlink control channel is changed from the NDI corresponding to initial transmission of the PUSCH, that is, the downlink control channel schedules transmission of a new PUSCH, then the terminal will not retransmit the PUSCH.

For Semi-Persistent Scheduling of a PUSCH: if an NDI in the downlink control channel is 0, which indicates that the downlink control channel is a downlink control channel instructing a downlink SPS resource to be activated or released, i.e., a scheduling command of the SPS PUSCH, then the terminal will not retransmit the PUSCH; and if the NDI in the downlink control channel is 1, then the terminal will retransmit the PUSCH.

In the embodiment of the invention, if the terminal detects a downlink control channel with an uplink DCI format in the subframe m+k, that is, an HARQ of the PUSCH transmitted by the terminal is synchronous, then in another possible implementation, a downlink control channel corresponding to a PUSCH transmitted in a special subframe, and a downlink control channel corresponding to a PUSCH transmitted in a normal subframe may be distinguished using different subframes, that is, the subframe m+k is different from a subframe detected for a PUSCH transmitted in a normal subframe; where k is defined as follows.

1) For the TDD uplink-downlink configuration 1, m is 1 or 6, and k is 4 or 9.

Particularly for the TDD uplink-downlink configuration 1, the terminal detects in the subframe m+4 or the subframe m+9 for a downlink control channel corresponding to the PUSCH transmitted in the special subframe m, that is, the terminal detects in the subframe 5 or the subframe 0 for a downlink control channel corresponding to the PUSCH transmitted in the special subframe 1 or 6, and as depicted in Table 6, the terminal detects in the subframe 1, the subframe 4, the subframe 6, or the subframe 9 for a downlink control channel corresponding to a PUSCH transmitted in a normal subframe, so the subframe detected for a downlink control channel corresponding to the PUSCH transmitted in the special subframe is different from the subframe detected for a downlink control channel corresponding to a PUSCH transmitted in a normal subframe.

2) For the TDD uplink-downlink configuration 2, m is 1 or 6, and k is 3, 4, 5, 8, 9, or 10.

Particularly for the TDD uplink-downlink configuration 2, the terminal detects in the subframe m+3, the subframe m+4, the subframe m+5, the subframe m+8, the subframe m+9, or the subframe m+10 for a downlink control channel corresponding to the PUSCH transmitted in the special subframe m, that is, the terminal detects in the subframe 0, the subframe 1, the subframe 4, the subframe 5, the subframe 6, or the subframe 9 for a downlink control channel corresponding to the PUSCH transmitted in the special subframe 1 or 6, and as depicted in Table 6, the terminal detects in the subframe 3 or the subframe 8 for a downlink control channel corresponding to a PUSCH transmitted in a normal subframe, so the subframe detected for a downlink control channel corresponding to the PUSCH transmitted in the special subframe is different from the subframe detected for a downlink control channel corresponding to a PUSCH transmitted in a normal subframe.

3) For the TDD uplink-downlink configuration 3, m is 1, and k is 4, 5, 6, or 10.

Particularly for the TDD uplink-downlink configuration 3, the terminal detects in the subframe m+4, the subframe m+5, the subframe m+6, or the subframe m+10 for a downlink control channel corresponding to the PUSCH transmitted in the special subframe m, that is, the terminal detects in the subframe 1, the subframe 5, the subframe 6, or the subframe 7 for a downlink control channel corresponding to the PUSCH transmitted in the special subframe 1, and as depicted in Table 6, the terminal detects in the subframe 0, the subframe 8, or the subframe 9 for a downlink control channel corresponding to a PUSCH transmitted in a normal subframe, so the subframe detected for a downlink control channel corresponding to the PUSCH transmitted in the special subframe is different from the subframe detected for a downlink control channel corresponding to a PUSCH transmitted in a normal subframe.

4) For the TDD uplink-downlink configuration 4, m is 1, and k is 3, 4, 5, 6, 9, or 10.

Particularly for the TDD uplink-downlink configuration 4, the terminal detects in the subframe m+3, the subframe m+4, the subframe m+5, the subframe m+6, the subframe m+9, or the subframe m+10 for a downlink control channel corresponding to the PUSCH transmitted in the special subframe m, that is, the terminal detects in the subframe 0, the subframe 1, the subframe 4, the subframe 5, the subframe 6, or the subframe 7 for a downlink control channel corresponding to the PUSCH transmitted in the special subframe 1, and as depicted in Table 6, the terminal detects in the subframe 8 or the subframe 9 for a downlink control channel corresponding to a PUSCH transmitted in a normal subframe, so the subframe detected for a downlink control channel corresponding to the PUSCH transmitted in the special subframe is different from the subframe detected for a downlink control channel corresponding to a PUSCH transmitted in a normal subframe.

5) For the TDD uplink-downlink configuration 5, m is 1, and k is 2, 3, 4, 5, 6, 8, 9, or 10.

Particularly for the TDD uplink-downlink configuration 5, the terminal detects in the subframe m+2, the subframe m+3, the subframe m+4, the subframe m+5, the subframe m+6, the subframe m+8, the subframe m+9, or the subframe m+10 for a downlink control channel corresponding to the PUSCH transmitted in the special subframe m, that is, the terminal detects in the subframe 0, the subframe 1, the subframe 3, the subframe 4, the subframe 5, the subframe 6, the subframe 7, or the subframe 9 for a downlink control channel corresponding to the PUSCH transmitted in the special subframe 1, and as depicted in Table 6, the terminal detects the subframe 8 for a downlink control channel corresponding to a PUSCH transmitted in a normal subframe, so the subframe detected for a downlink control channel corresponding to the PUSCH transmitted in the special subframe is different from the subframe detected for a downlink control channel corresponding to a PUSCH transmitted in a normal subframe.

Particularly k is defined as depicted in Table 7:

TABLE 7

| TDD UL-DL | Subframe index n | | | | | | | |
|---|---|---|---|---|---|---|---|---|
| configuration 0 | 1 | 2 | 3 | 4 | 5 | 6 | 7 | 8 |
| 0 | 4 or 5 or 9 or 10 | | | | | 4 or 5 or 9 or 10 | | |
| 1 | 3 or 4 or 5 or 8 or 9 or 10 | | | | | 3 or 4 or 5 or 8 or 9 or 10 | | |
| 2 | 2 or 3 or 4 or 5 or 7 or 8 or 9 or 10 | | | | | 2 or 3 or 4 or 5 or 7 or 8 or 9 or 10 | | |
| 3 | 4 or 5 or 6 or 7 or 8 or 9 or 10 | | | | | | | |
| 4 | 3 or 4 or 5 or 6 or 7 or 8 or 9 or 10 | | | | | | | |
| 5 | 2 or 3 or 4 or 5 or 6 or 7 or 8 or 9 or 10 | | | | | | | |
| 6 | 4 or 5 or 8 or 9 or 10 | | | | | 3 or 4 or 5 or 9 or 10 | | |

In Table 7, the TDD uplink-downlink configuration is an uplink reference TDD uplink-downlink configuration, or a TDD uplink-downlink configuration configured in system information.

Furthermore, if the subframe m+k is different from the subframe detected for a downlink control channel corresponding to a PUSCH transmitted in a normal subframe, then the terminal will decide whether to retransmit the PUSCH transmitted in the special subframe m, according to the downlink control channel in the step S23 in the following two instances.

1. If the terminal does not detect any downlink control channel with an uplink DCI format in the subframe m+k, then the terminal will determine that the PUSCH transmitted in the special subframe m has been transmitted successfully, and will not be retransmitted.

2. If the terminal detects a downlink control channel with an uplink DCI format in the subframe m+k, then the terminal will decide whether to retransmit the PUSCH transmitted in the special subframe m, according to an indicating field, for indicating whether to retransmit the PUSCH, carried in the downlink control channel.

Optionally, the indicating field for indicating whether to retransmit the PUSCH is an NDI, that is, the terminal decides whether to retransmit the PUSCH transmitted in the special subframe, according to the NDI carried in the downlink control channel.

Particularly for dynamic scheduling: if an NDI in the downlink control channel is not changed from an NDI corresponding to initial transmission of the PUSCH, the terminal will retransmit the PUSCH; and if the NDI in the downlink control channel is changed from the NDI corresponding to initial transmission of the PUSCH, that is, the downlink control channel schedules transmission of a new PUSCH, then the terminal will not retransmit the PUSCH.

For SPS of a PUSCH: if an NDI in the downlink control channel is 0, then the terminal will not retransmit the PUSCH; and if the NDI in the downlink control channel is 1, then the terminal will retransmit the PUSCH.

It shall be noted that when the terminal transmits a PUSCH in the normal subframe n, the terminal detects in the subframe n+k for a PHICH corresponding to the PUSCH, and/or a downlink control channel with an uplink DCI format, where k is $k_{PHICH}$ which is a value predefined in the standard as depicted in Table 3 to specify that the subframe n+$k_{PHICH}$ is detected for a PHICH of the PUSCH transmitted in the subframe n; and furthermore the terminal decides whether to retransmit the PUSCH, according to the detected PHICH and/or downlink control channel as in the prior art.

Figure 3:
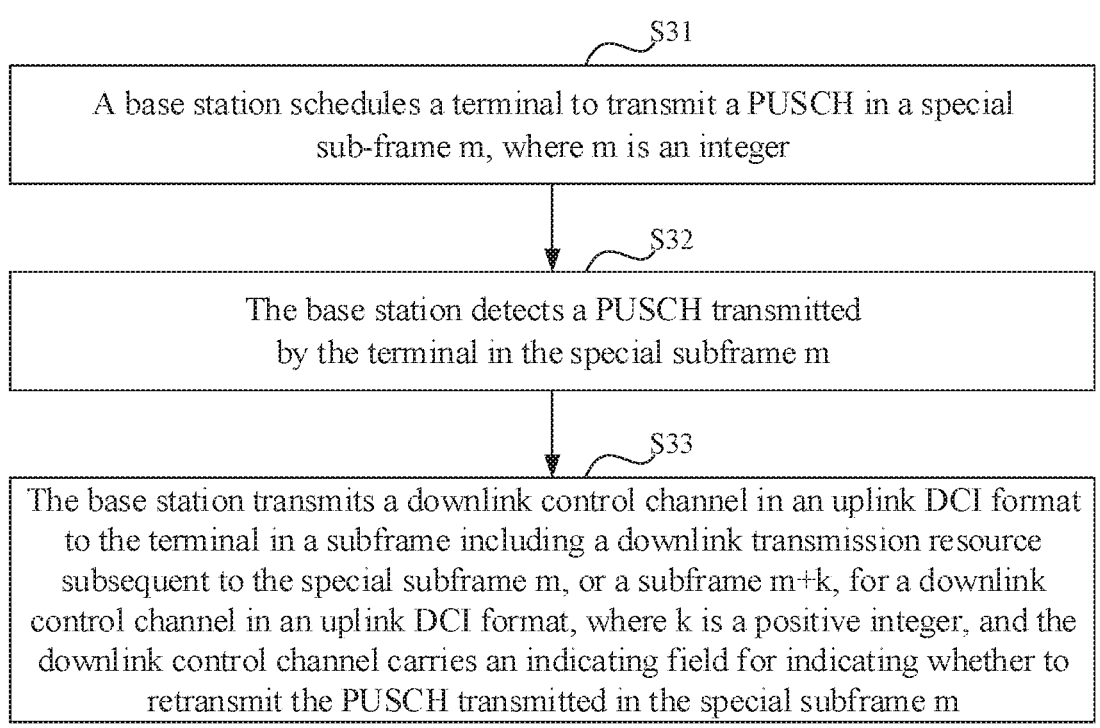
FIG. 3 is a schematic flow chart of a method for transmitting feedback information of uplink transmission according to an embodiment of the invention.

Based upon the same inventive idea, FIG. 3 illustrates a method for transmitting feedback information of uplink transmission according to an embodiment of the invention, where the method includes the following steps.

In the step S31, a base station schedules a terminal to transmit a PUSCH in a special subframe m, where m is an integer.

In the step S32, the base station detects in the special subframe m for a PUSCH transmitted by the terminal.

In the step S33, the base station transmits a downlink control channel with an uplink DCI format to the terminal in a subframe including a downlink transmission resource subsequent to the special subframe m, or in a subframe m+k, for a downlink control channel with an uplink DCI format, where k is a positive integer, and the downlink control channel carries an indicating field for indicating whether to retransmit the PUSCH transmitted in the special subframe m.

Optionally, the indicating field for indicating whether to retransmit the PUSCH transmitted in the special subframe m is an NDI.

In the embodiment of the invention, the base station schedules the terminal to transmit a PUSCH in the special subframe m, and detects in the special subframe m for a PUSCH transmitted by the terminal; and the base station transmits a downlink control channel with an uplink DCI format to the terminal in a subframe including a downlink transmission resource subsequent to the special subframe m, or in the subframe m+k, for a downlink control channel with an uplink DCI format, where the downlink control channel carries an indicating field for indicating whether to retransmit the PUSCH transmitted in the special subframe m, so that there is provided a solution to transmitting feedback information of a PUSCH transmitted in a special subframe so as to enable ACK/NACK feedback information of the PUSCH transmitted in the special subframe to be obtained normally.

In a possible implementation, k is defined as follows:
for the TDD uplink-downlink configuration 0, if m is 1 or 6, then k will be 4, 5, 9, or 10; or
for the TDD uplink-downlink configuration 1, if m is 1 or 6, then k will be 3, 5, 8, or 10; or
for the TDD uplink-downlink configuration 2, if m is 1 or 6, then k will be 2 or 7; or
for the TDD uplink-downlink configuration 3, if m is 1, then k will be 7, 8, or 9; or
for the TDD uplink-downlink configuration 4, if m is 1, then k will be 7 or 8; or
for the TDD uplink-downlink configuration 5, if m is 1, then k will be 7; or
for the TDD uplink-downlink configuration 6, if m is 1, then k will be 4, 5, 8, 9, or 10; or
for the TDD uplink-downlink configuration 6, if m is 6, then k will be 3, 4, 5, 9, or 10.

Further to any one of the embodiments above, the base station transmits the downlink control channel with the uplink DCI format to the terminal as follows:
the base station determines the size of the uplink DCI format for the downlink control channel according to whether the downlink control channel corresponds to a PUSCH transmitted in a special subframe; and/or
the base station carries a first indicating field in the downlink control channel, where the first indicating field indicates information about a PUSCH corresponding to the downlink control channel; and/or
the base station carries a second indicating field in the downlink control channel, where the second indicating field indicates whether a PUSCH corresponding to the downlink control channel is a PUSCH transmitted in a special subframe, or a PUSCH in a normal subframe; and/or
the base station determines a Radio Network Temporary Identifier (RNTI) for scrambling the downlink control channel, according to whether the downlink control channel corresponds to a PUSCH transmitted in a special subframe; and/or
the base station determines the value of a 2-bit uplink (UL) index indicating field in the downlink control channel according to whether the downlink control channel corresponds to a PUSCH transmitted in a special subframe.

In a possible implementation, the base station determines the size of the uplink DCI format for the downlink control channel according to whether the downlink control channel corresponds to a PUSCH transmitted in a special subframe as follows:

if the downlink control channel corresponds to a PUSCH transmitted in a special subframe, then the base station will determine that the uplink DCI format for the downlink control channel has a first DCI size; or if the downlink control channel corresponds to a PUSCH transmitted in a normal subframe, then the base station will determine that the uplink DCI format for the downlink control channel has a second DCI size;

where the first DCI size is different from the second DCI size.

In a possible implementation, the first indicating field carries an HARQ process number of the PUSCH corresponding to the downlink control channel.

In a possible implementation, the base station determines the RNTI for scrambling the downlink control channel, according to whether the downlink control channel corresponds to a PUSCH transmitted in a special subframe as follows:

if the downlink control channel corresponds to a PUSCH transmitted in a special subframe, then the base station will determine that the downlink control channel is scrambled using a first RNTI; or if the downlink control channel corresponds to a PUSCH transmitted in a normal subframe, then the base station will determine that the downlink control channel is scrambled using a second RNTI;

where the first RNTI is different from the second RNTI.

In a possible implementation, if the RNTI corresponding to the special subframe is shared by a plurality of terminals, then the method will further include:

the base station maps the indicating fields, for indicating whether to retransmit PUSCHs, of the plurality of terminals to corresponding positions in the downlink control channel corresponding to a special subframe according to indexes of the plurality of terminals.

In a possible implementation, the subframe m+k is different from a subframe detected for a downlink control channel corresponding to a PUSCH transmitted in a normal subframe.

In this implementation, optionally, k is defined as follows:

for the TDD uplink-downlink configuration 1, m is 1 or 6, and k is 4 or 9; or for the TDD uplink-downlink configuration 2, m is 1 or 6, and k is 3, 4, 5, 8, 9, or 10; or for the TDD uplink-downlink configuration 3, m is 1, and k is 4, 5, 6, or 10; or for the TDD uplink-downlink configuration 4, m is 1, and k is 3, 4, 5, 6, 9, or 10; or for the TDD uplink-downlink configuration 5, m is 1, and k is 2, 3, 4, 5, 6, 8, 9, or 10.

In a possible implementation, the base station determines the value of the 2-bit uplink (UL) index indicating field in the downlink control channel according to whether the downlink control channel corresponds to a PUSCH transmitted in a special subframe as follows:

if the downlink control channel corresponds to a PUSCH transmitted in a special subframe, then the base station will set both a Least Significant Bit (LSB) and a Most Significant Bit (MSB) in the UL index to 0; and if the downlink control channel corresponds to a PUSCH transmitted in a normal subframe, then the base station will set at least one of the LSB and the MSB in the UL index to 1.

The methods according to the embodiments of the invention will be described below in details in connection with three particular embodiments thereof.

In a first embodiment, this embodiment relates to the TDD uplink-downlink configuration 1 by way of an example, where for example, an HARQ of a PUSCH transmitted in an UpPTS in a special subframe 1 or 6 is asynchronous, and feedback information is carried in a downlink control channel; and the downlink control channel corresponding to the PUSCH transmitted in the UpPTS includes a first indicating field for indicating an HARQ process number of the PUSCH transmitted in the UpPTS, where the HARQ process number of the PUSCH transmitted in the UpPTS in the special subframe 1 is 0, and the HARQ process number of the PUSCH transmitted in the UpPTS in the special subframe 6 is 1. Implementations at the base station side and the terminal side will be described below respectively.

1. At the base station side:

1) A base station schedules a terminal to transmit a PUSCH-1 in an UpPTS in a special subframe 1; and receives the PUSCH-1 transmitted by the terminal in the special subframe 1, and obtains 1-bit ACK/NACK feedback information thereof, where:

if the ACK/NACK feedback information is ACK, then if the base station has no new uplink data transmission to be scheduled, then it will not transmit any downlink control channel with an uplink DCI format to the terminal; and if the base station has new uplink data transmission to be scheduled, then it will invert an NDI from an NDI in a downlink control channel corresponding to initial transmission of the PUSCH-1 (that is, it sets the NDI to a different value, and for example, if the NDI corresponding to initial transmission is 0, then it will set the NDI in the downlink control channel to 1), and transmit a downlink control channel carrying the NDI to the terminal in any one subframe including a downlink resource subsequent to the special subframe 1, or any one subframe including a downlink resource in a preset period of time subsequent to the special subframe 1 (e.g., any one downlink subframe and/or special subframe among ten subframes subsequent to the special subframe, dependent upon how the base station schedules the terminal and allocates a resource); and if the ACK/NACK feedback information is NACK, then the base station will transmit a downlink control channel with an uplink DCI format to the terminal in any one subframe including a downlink resource subsequent to the special subframe 1, or any one subframe including a downlink resource in a preset period of time subsequent to the special subframe 1 (e.g., any one downlink subframe and/or special subframe among ten subframes subsequent to the special subframe, dependent upon how the base station schedules the terminal and allocates a resource), e.g., a subframe 9, set an NDI in the downlink control channel to the same value as an NDI in a downlink control channel corresponding to initial transmission of the PUSCH-1 (for example, if the NDI corresponding to initial transmission is 0, then it will also set the NDI in the downlink control channel to 0), and have a first indicating field in the downlink control channel indicate the PUSCH-1 transmitted in the special subframe 1, for example, the 1-bit first indicating field indicating "0" indicates an HARQ process number 0 of the PUSCH transmitted in the UpPTS.

2) The base station schedules the terminal to transmit a PUSCH-2 in an UpPTS in a special subframe 6; and receives the PUSCH-2 transmitted by the terminal in the special subframe 6, and obtains 1-bit ACK/NACK feedback information thereof, where:

if the ACK/NACK feedback information is ACK, then if the base station has no new uplink data transmission to be scheduled, then it will not transmit any downlink control channel with an uplink DCI format to the terminal; and if the base station has new uplink data transmission to be scheduled, then it will invert an NDI from an NDI in a downlink control channel corresponding to initial transmission of the PUSCH-2 (that is, it sets the NDI to a different value, and for example, if the NDI corresponding to initial transmission is 0, then it will set the NDI in the downlink control channel to 1), and transmit a downlink control channel carrying the NDI to the terminal in any one subframe including a downlink resource subsequent to the special subframe 6, or any one subframe including a downlink resource in a preset period of time subsequent to the special subframe 6 (e.g., any one downlink subframe and/or special subframe among ten subframes subsequent to the special subframe, dependent upon how the base station schedules the terminal and allocates a resource); and if the ACK/NACK feedback information is NACK, then the base station will transmit a downlink control channel with an uplink DCI format to the terminal in any one subframe including a downlink resource subsequent to the special subframe 6, or any one subframe including a downlink resource in a preset period of time subsequent to the special subframe 6 (e.g., any one downlink subframe and/or special subframe among ten subframes subsequent to the special subframe, dependent upon how the base station schedules the terminal and allocates a resource), e.g., a subframe 9, set an NDI in the downlink control channel to the same value as an NDI in a downlink control channel corresponding to initial transmission of the PUSCH-2 (for example, if the NDI corresponding to initial transmission is 0, then it will also set the NDI in the downlink control channel to 0), and have a first indicating field in the downlink control channel indicate the PUSCH-2 transmitted in the special subframe 6, for example, the 1-bit first indicating field indicating "1" indicates an HARQ process number 1 of the PUSCH transmitted in the UpPTS.

It shall be noted that although both of the feedback information of the PUSCH-1 and the PUSCH-2 transmitted in the UpPTS's in the special subframe 1 and the special subframe 6, is obtained from the downlink control channels transmitted in the subframe 9, since the two downlink control channels indicate the HARQ process numbers of the PUSCHs transmitted in the different UpPTS respectively, the terminal side can distinguish the feedback information of the PUSCH-1 and the PUSCH-2.

3) The base station schedules the terminal to transmit a PUSCH-3 in a normal uplink subframe 2; receives the PUSCH-3 transmitted by the terminal in the uplink subframe 2, and obtains 1-bit ACK/NACK feedback information thereof; and decides to transmit a PHICH of the PUSCH-3 in the subframe 6, according to $k_{PHICH}$ as defined in Table 3, determines a PHICH resource parameter thereof ($n_{PHICH}^{group}$, $n_{PHICH}^{seq}$) according to the lowest PRB index of the PUSCH-3, and a DMRS cyclic shift indicator in scheduling signaling, and transmits the PHICH, carrying the ACK/NACK feedback information of the PUSCH-3, in the subframe 6 according to the parameter.

Of course, if the ACK/NACK feedback information is NACK, then if the base station is going to change a resource and a configuration for retransmitting the PUSCH-3, through dynamic scheduling, then it may further transmit a downlink control channel with an uplink DCI format in the subframe 6, and set an NDI in the downlink control channel to the same value as an NDI in a downlink control channel corresponding to initial transmission of the PUSCH-3 (for example, if the NDI corresponding to initial transmission is 0, then the NDI in the downlink control channel will be also set to 0).

2. At the terminal side:

1) A terminal receives scheduling information for scheduling the terminal to transmit a PUSCH-1 in an UpPTS in a special subframe 1, and transmits the PUSCH-1 in the UpPTS in the special subframe 1 according to the scheduling information; and detects in a subframe including a downlink transmission resource subsequent to the special subframe 1, or any one subframe including a downlink resource in a preset period of time subsequent to the special subframe 1 (e.g., each downlink subframe and/or special subframe among ten subframes subsequent to the special subframe), for a downlink control channel with an uplink DCI format.

Particularly, if a preset period of time is specified, then if no downlink control channel with an uplink DCI format is detected in the preset period of time, then the terminal will determine that the base station has not transmitted any downlink control channel indicating retransmission, that is, the terminal will determine that the PUSCH-1 has been transmitted successfully, and will not be retransmitted. If no preset period of time is specified, then the terminal will reserve information about the PUSCH-1, and will not further operate until the terminal receives such DCI that it can decide whether to retransmit the PUSCH-1. If a downlink control channel is detected, e.g., in a subframe 9, then the terminal will determine that the downlink control channel corresponds to the PUSCH-1 transmitted in the UpPTS in the special subframe 1, according to a process number indicated by a first indicating field in the downlink control channel, and then decide whether to retransmit the PUSCH-1, according to whether an NDI in the downlink control channel is inverted from the NDI corresponding to initial transmission of the PUSCH-1. For example, if the NDI is the same as the NDI corresponding to initial transmission, then the terminal will decide to retransmit the PUSCH-1, and retransmit the PUSCH-1 according to scheduling information in the downlink control channel (i.e., an indicated resource, modulation and coding level, etc.); and in another example, if the NDI is different from the NDI corresponding to initial transmission, then the terminal will determine that new data are to be transmitted, and start to transmit the new data, according to the scheduling information, that is, the terminal will determine that the PUSCH-1 has been transmitted successfully, and will not be retransmitted.

2) The terminal receives scheduling information for scheduling the terminal to transmit a PUSCH-2 in an UpPTS in a special subframe 6, and transmits the PUSCH-2 in the UpPTS in the special subframe 6 according to the scheduling information; and detects in a subframe including a downlink transmission resource subsequent to the special subframe 1, or any one subframe including a downlink resource in a preset period of time subsequent to the special subframe 1 (e.g., each downlink subframe and/or special subframe among ten subframes subsequent to the special subframe), for a downlink control channel with an uplink DCI format.

Particularly if a preset period of time is specified, then if no downlink control channel with an uplink DCI format is detected in the preset period of time, then the terminal will determine that the base station has not transmitted any downlink control channel indicating retransmission, that is, the terminal will determine that the PUSCH-2 has been transmitted successfully, and will not be retransmitted. If no preset period of time is specified, then the terminal will reserve information about the PUSCH-2, and will not further operate until the terminal receives such DCI that it can decide whether to retransmit the PUSCH-2. If a downlink control channel is detected, e.g., in a subframe 9, then the terminal will determine that the downlink control channel corresponds to the PUSCH-2 transmitted in the UpPTS in the special subframe 6, according to a process number indicated by a first indicating field in the downlink control channel, and then decide whether to retransmit the PUSCH-2, according to whether an NDI in the downlink control channel is inverted from the NDI corresponding to initial transmission of the PUSCH-2. For example, if the NDI is the same as the NDI corresponding to initial transmission, then the terminal will decide to retransmit the PUSCH-2, and retransmit the PUSCH-2 according to scheduling information in the downlink control channel (i.e., an indicated resource, modulation and coding level, etc.); and in another example, if the NDI is different from the NDI corresponding to initial transmission, then the terminal will determine that new data are to be transmitted, and start to transmit the new data, according to the scheduling information, that is, the terminal will determine that the PUSCH-2 has been transmitted successfully, and will not be retransmitted.

3) The terminal receives scheduling information for scheduling the terminal to transmit a PUSCH-3 in a normal uplink subframe 2, and transmits the PUSCH-3 in the uplink subframe 2 according to the scheduling information; and determines that a PHICH of the PUSCH-3 is transmitted in the subframe 6, according to $k_{PHICH}$ as defined in Table 3, determines a PHICH resource parameter thereof ($n_{PHICH}^{group}$, $n_{PHICH}^{seq}$) according to the lowest PRB index of the PUSCH-3, and a DMRS cyclic shift indicator in scheduling signaling, detects in the subframe 6 for a PHICH carrying ACK/NACK feedback information of the PUSCH-3 according to the parameter, and decides whether to retransmit the PUSCH-3, according to the feedback information in the PHICH. Particularly, if the feedback information is ACK, it is unnecessary to retransmit the PUSCH-3; if the feedback information is NACK, retransmitting the PUSCH-3 according to the scheduling information for first transmitting the PUSCH-3.

Of course, the terminal can also detect in the subframe 6 for a downlink control channel with an uplink DCI format, and if no downlink control channel with an uplink DCI format is detected, then reference will be made to the feedback information in the PHICH above; and if a downlink control channel with an uplink DCI format is detected, then the terminal will whether to decide retransmit the PUSCH-3, according to whether an NDI in the downlink control channel is inverted from an NDI corresponding to initial transmission of the PUSCH-3. Particularly if the NDI is the same as the NDI corresponding to initial transmission, then the terminal will decide to retransmit the PUSCH-3, and retransmit the PUSCH-3 according to scheduling information in the downlink control channel (i.e., an indicated resource, modulation and coding level, etc.); and if the NDI is different from the NDI corresponding to initial transmission, then the terminal will determine that new data are to be transmitted, and start to transmit the new data, according to the scheduling information, that is, the terminal will determine that the PUSCH-3 has been transmitted successfully, and will not be retransmitted.

In this embodiment, if a DCI size for a downlink control channel corresponding to a PUSCH transmitted in an UpPTS is different from a DCI size for a downlink control channel corresponding to a PUSCH transmitted in a normal uplink subframe, then the downlink control channel corresponding to the PUSCH transmitted in the UpPTS may also be transmitted in a PHICH transmission subframe corresponding to the normal uplink subframe, and at this time, the terminal can detect uplink DCI formats with different sizes blindly to determine whether the downlink control channel corresponds to the PUSCH in the UpPTS, or the PUSCH in the normal uplink subframe. If a DCI size for a downlink control channel corresponding to a PUSCH transmitted in an UpPTS is the same as a DCI size for a downlink control channel corresponding to a PUSCH transmitted in a normal uplink subframe, then the scheduling base station will avoid the downlink control channel corresponding to the PUSCH transmitted in the UpPTS from being transmitted in the same subframe as the downlink control channel corresponding to the PUSCH transmitted in the normal uplink subframe, or will define or configure the downlink control channel corresponding to the PUSCH transmitted in the UpPTS, and the downlink control channel corresponding to the PUSCH transmitted in the normal uplink subframe to be distinguished using different RNTIs, or will define distinguishing second bit fields in the downlink control channel corresponding to the PUSCH transmitted in the UpPTS, and the downlink control channel corresponding to the PUSCH transmitted in the normal uplink subframe; where in order not to change the original DCI size in the normal uplink subframe, an idle bit field in the DCI can be reused as the second bit field.

In a second embodiment, this embodiment still relates to the TDD uplink-downlink configuration 1 by way of an example, where an HARQ of a PUSCH transmitted in an UpPTS in a special subframe 1 or 6 is asynchronous, and feedback information is carried in a downlink control channel. Implementations at the base station side and the terminal side will be described below respectively.

1. At the base station side:
   1) A base station schedules a terminal to transmit a PUSCH-1 in an UpPTS in a special subframe 1; and receives the PUSCH-1 transmitted by the terminal in the special subframe 1, and obtains 1-bit ACK/NACK feedback information thereof, where:
   if the ACK/NACK feedback information is ACK, then if the base station has no new uplink data transmission to be scheduled, then it will not transmit any downlink control channel with an uplink DCI format to the terminal; and if the base station has new uplink data transmission to be scheduled, then it will invert an NDI from an NDI in a downlink control channel corresponding to initial transmission of the PUSCH-1 (that is, it sets the NDI to a different value, and for example, if the NDI corresponding to initial transmission is 0, then it will set the NDI in the downlink control channel to 1), and transmit a downlink control channel carrying the NDI to the terminal in any one subframe including a downlink resource subsequent to the special subframe 1, or any one subframe including a downlink resource in a preset period of time subsequent to the special subframe 1 (e.g., any one downlink subframe and/or special subframe among ten subframes subsequent to the special subframe, dependent upon how the base station schedules the terminal and allocates a resource); and if the ACK/NACK feedback information is NACK, then the base station will transmit a downlink control channel with an uplink DCI format to the terminal in any one subframe including a downlink resource subsequent to the special subframe 1, or any one subframe including a downlink resource in a preset period of time subsequent to the special subframe 1 (e.g., any one downlink subframe and/or special subframe among ten subframes subsequent to the special subframe, dependent upon how the base station schedules the terminal and allocates a resource), e.g., a subframe 6, set an NDI in the downlink control channel to the same value as an NDI in a downlink control channel corresponding to initial transmission of the PUSCH-1, and for example, if the NDI corresponding to initial transmission is 0, then it will also set the NDI in the downlink control channel to 0. Furthermore the base station can process the downlink control channel with any one of the following schemes:

in a scheme A, the base station transmits the downlink control channel in a first DCI size; where the first DCI size is different from a DCI size corresponding to a normal uplink subframe;

in a scheme B, the base station sets a second indicating field in the downlink control channel to "1" to indicate that the downlink control channel corresponds to a PUSCH in an UpPTS; and in a scheme C, the base station scrambles the downlink control channel using a first RNTI; where the first RNTI is different from an RNTI corresponding to a normal uplink subframe to distinguish a downlink control channel corresponding to a PUSCH in the normal uplink subframe.

2) The base station schedules the terminal to transmit a PUSCH-2 in a normal uplink subframe 2; receives the PUSCH-2 transmitted by the terminal in the uplink subframe 2, and obtains 1-bit ACK/NACK feedback information thereof; and decides to transmit a PHICH of the PUSCH-2 in the subframe 6, according to $k_{PHICH}$ as defined in Table 3, determines a PHICH resource parameter thereof ($n_{PHICH}^{group}$, $n_{PHICH}^{seq}$) according to the lowest PRB index of the PUSCH-2, and a DMRS cyclic shift indicator in scheduling signaling, and transmits the PHICH, carrying the ACK/NACK feedback information of the PUSCH-2, in the subframe 6 according to the parameter.

Of course, if the ACK/NACK feedback information is NACK, then if the base station is going to change a resource and a configuration for retransmitting the PUSCH-2, through dynamic scheduling, then it may further transmit a downlink control channel with an uplink DCI format in the subframe 6, and set an NDI in the downlink control channel to the same value as an NDI in a downlink control channel corresponding to initial transmission of the PUSCH-2 (for example, if the NDI corresponding to initial transmission is 0, then the NDI in the downlink control channel will be also set to 0). Furthermore the base station can process the downlink control channel with any one of the following schemes:

in a first scheme, the base station transmits the downlink control channel in a second DCI size; where the second DCI size is a DCI size corresponding to a normal uplink subframe;

in a second scheme, the base station sets a second indicating field in the downlink control channel to "0" to indicate that the downlink control channel corresponds to a PUSCH transmitted in a normal uplink subframe; and in a third scheme, the base station scrambles the downlink control channel using a second RNTI to distinguish a downlink control channel corresponding to a PUSCH in an UpPTS.

2. At the terminal side:

1) A terminal receives scheduling information for scheduling the terminal to transmit a PUSCH-1 in an UpPTS in a special subframe 1, and transmits the PUSCH-1 in the UpPTS in the special subframe 1 according to the scheduling information; and detects in a subframe including a downlink transmission resource subsequent to the special subframe 1, or any one subframe including a downlink resource in a preset period of time subsequent to the special subframe 1 (e.g., each downlink subframe and/or special subframe among ten subframes subsequent to the special subframe), for a downlink control channel with an uplink DCI format. If a preset period of time is defined, then if no downlink control channel with an uplink DCI format is detected in the preset period of time, then the terminal will determine that the base station has not transmitted any downlink control channel indicating retransmission, that is, the terminal will determine that the PUSCH-1 has been transmitted successfully, and will not be retransmitted. If no preset period of time is specified, then the terminal will reserve information about the PUSCH-1, and will not further operate until the terminal receives such DCI that it can decide whether to retransmit the PUSCH-1. If a downlink control channel with an uplink DCI format is detected, e.g., in a subframe 6, then the terminal will operate in a corresponding scheme to the base station side:

in a scheme A, if the detected DCI size is the first DCI size (that is, the first DCI size and the second DCI size are detected blindly to determine that the downlink control channel is a downlink control channel with the first DCI size), then the terminal will determine that the downlink control channel corresponds to the PUSCH in the UpPTS;

in a scheme B, if a second indicating field in the downlink control channel is "1", then the terminal will determine that the downlink control channel corresponds to the PUSCH in the UpPTS; and in a scheme C, if the downlink control channel is scrambled using the first RNTI (that is, the first RNTI and the second RNTI are detected blindly to determine that the downlink control channel is scrambled using the first RNTI), then the terminal will determine that the downlink control channel corresponds to the PUSCH in the UpPTS.

Furthermore, the terminal decides whether to retransmit the PUSCH-1, according to whether an NDI in the downlink control channel is inverted from an NDI corresponding to initial transmission of the PUSCH-1. For example, if the NDI is the same as the NDI corresponding to initial transmission, then the terminal will decide to retransmit the PUSCH-1, and retransmit the PUSCH-1 according to scheduling information in the downlink control channel (i.e., an indicated resource, modulation and coding level, etc.); and in another example, if the NDI is different from the NDI corresponding to initial transmission, then the terminal will determine that new data are to be transmitted, and start to transmit the new data, according to the scheduling information, that is, the terminal will determine that the PUSCH-1 has been transmitted successfully, and will not be retransmitted.

2) The terminal receives scheduling information for scheduling the terminal to transmit a PUSCH-2 in a normal uplink subframe 2, and transmits the PUSCH-2 in the uplink subframe 2 according to the scheduling information; and determines that a PHICH of the PUSCH-2 is transmitted in the subframe 6, according to $k_{PHICH}$ as defined in Table 3, determines a PHICH resource parameter thereof ($n_{PHICH}^{group}$, $n_{PHICH}^{seq}$) according to the lowest PRB index of the PUSCH-2, and a DMRS cyclic shift indicator in scheduling signaling, detects in the subframe 6 for a PHICH carrying ACK/NACK feedback information of the PUSCH-2 according to the parameter, and decides whether to retransmit the PUSCH-2, according to the feedback information in the PHICH. If the ACK/NACK feedback information is ACK, then the terminal will decide not to retransmit the PUSCH-2; and if the ACK/NACK feedback information is NACK, then the terminal will retransmit the PUSCH-2 according to the same scheduling information as initial transmission. Of course, the terminal can also detect in the subframe 6 for a downlink control channel with an uplink DCI format, and if no downlink control channel with an uplink DCI format is detected, then reference will be made to the feedback information in the PHICH above; and if a downlink control channel with an uplink DCI format is detected, then the terminal will operate in a corresponding scheme to the base station side:

in a first scheme, the terminal determines that the downlink control channel corresponds to a PUSCH in a normal uplink subframe, when a detected DCI size is the second DCI size (that is, the first DCI and the second DCI are detected blindly to determine that the downlink control channel is a DCI format in the second DCI size);

in a second scheme, the terminal determines that the downlink control channel corresponds to a PUSCH in a normal uplink subframe, when a second indicating field in the downlink control channel is "0"; and in a third scheme, the terminal determines that the downlink control channel corresponds to a PUSCH in a normal uplink subframe, when the downlink control channel is scrambled using the second RNTI (that is, the first RNTI and the second RNTI are detected blindly to determine that the downlink control channel is scrambled using the second RNTI).

Furthermore, the terminal decides whether to retransmit the PUSCH-2, according to whether an NDI in the downlink control channel is inverted from an NDI corresponding to initial transmission of the PUSCH-2. For example, if the NDI is the same as the NDI corresponding to initial transmission, then the terminal will decide to retransmit the PUSCH-2, and retransmit the PUSCH-2 according to scheduling information in the downlink control channel (i.e., an indicated resource, modulation and coding level, etc.); and in another example, if the NDI is different from the NDI corresponding to initial transmission, then the terminal will determine that new data are to be transmitted, and start to transmit the new data, according to the scheduling information, that is, the terminal will determine that the PUSCH-2 has been transmitted successfully, and will not be retransmitted.

In a third embodiment, this embodiment still relates to the TDD uplink-downlink configuration 1 by way of an example, where an HARQ of a PUSCH transmitted in an UpPTS in a special subframe 1 or 6 is synchronous, and ACK/NACK feedback information of a PUSCH transmitted in a special subframe m is obtained by detecting a subframe m+k for a downlink control channel carrying ACK/NACK feedback information. Implementations at the base station side and the terminal side will be described below respectively.

1. At the base station side:

1) A base station schedules a terminal to transmit a PUSCH-1 in an UpPTS in a special subframe 1; and receives the PUSCH-1 transmitted by the terminal in the special subframe 1, and obtains 1-bit ACK/NACK feedback information thereof, where:

if the ACK/NACK feedback information is ACK, then if the base station has no new uplink data transmission to be scheduled, then it will not transmit any downlink control channel with an uplink DCI format to the terminal; and if the base station has new uplink data transmission to be scheduled, then it will invert an NDI from an NDI in a downlink control channel corresponding to initial transmission of the PUSCH-1 (that is, it sets the NDI to a different value, and for example, if the NDI corresponding to initial transmission is 0, then it will set the NDI in the downlink control channel to 1), and transmit a downlink control channel carrying the NDI to the terminal in a subframe 5 (i.e., a subframe m+k); and if the ACK/NACK feedback information is NACK, then the base station will transmit a downlink control channel with an uplink DCI format to the terminal in a subframe 5 (i.e., a subframe m+k), set an NDI in the downlink control channel to the same value as an NDI in a downlink control channel corresponding to initial transmission of the PUSCH-1, and for example, if the NDI corresponding to initial transmission is 0, then it will also set the NDI in the downlink control channel to 0.

2) The base station schedules the terminal to transmit a PUSCH-2 in a normal uplink subframe 2; receives the PUSCH-2 transmitted by the terminal in the uplink subframe 2, and obtains 1-bit ACK/NACK feedback information thereof; and decides to transmit a PHICH of the PUSCH-2 in the subframe 6, according to $k_{PHICH}$ as defined in Table 3, determines a PHICH resource parameter thereof ($n_{PHICH}^{group}$, $n_{PHICH}^{seq}$) according to the lowest PRB index of the PUSCH-2, and a DMRS cyclic shift indicator in scheduling signaling, and transmits the PHICH, carrying the ACK/NACK feedback information of the PUSCH-2, in the subframe 6 according to the parameter.

Of course, if the ACK/NACK feedback information is NACK, then if the base station is going to change a resource and a configuration for retransmitting the PUSCH-2, through dynamic scheduling, then it may further transmit a downlink control channel with an uplink DCI format in the subframe 6, and set an NDI in the downlink control channel to the same value as an NDI in a downlink control channel corresponding to initial transmission of the PUSCH-2 (for example, if the NDI corresponding to initial transmission is 0, then the NDI in the downlink control channel will be also set to 0).

It shall be noted that since different feedback subframe positions are defined, the downlink control channels, carrying the ACK/NACK feedback information, transmitted in the subframe 5 and the subframe 6 can be scrambled using the same DCI and the same RNTI, and the terminal can determine whether the PUSCH corresponding to the downlink control channel corresponds to the UpPTS or the normal uplink subframe, according to the subframe in which the downlink control channel is detected.

2. At the terminal side:

1) A terminal receives scheduling information for scheduling the terminal to transmit a PUSCH-1 in an UpPTS in a special subframe 1, and transmits the PUSCH-1 in the UpPTS in the special subframe 1 according to the scheduling information; and decides to detect in a subframe 5 for a downlink control channel with an uplink DCI format, according to m+k.

Particularly, if no downlink control channel with an uplink DCI format is detected, then the terminal will determine that the base station has not transmitted any downlink control channel indicating retransmission, that is, the terminal will determine that the PUSCH-1 has been transmitted successfully, and will not be retransmitted.

If a downlink control channel with an uplink DCI format is detected, then the terminal will decide whether to retransmit the PUSCH-1, according to whether an NDI in the downlink control channel is inverted from an NDI corresponding to initial transmission of the PUSCH-1. For example, if the NDI is the same as the NDI corresponding to initial transmission, then the terminal will decide to retransmit the PUSCH-1, and retransmit the PUSCH-1 according to scheduling information in the downlink control channel (i.e., an indicated resource, modulation and coding level, etc.); and in another example, if the NDI is different from the NDI corresponding to initial transmission, then the terminal will determine that new data are to be transmitted, and start to transmit the new data, according to the scheduling information, that is, the terminal will determine that the PUSCH-1 has been transmitted successfully, and will not be retransmitted.

2) The terminal receives scheduling information for scheduling the terminal to transmit a PUSCH-2 in a normal uplink subframe 2, and transmits the PUSCH-2 in the uplink subframe 2 according to the scheduling information; and determines that a PHICH of the PUSCH-2 is transmitted in a subframe 6, according to $k_{PHICH}$ as defined in Table 3, determines a PHICH resource parameter thereof ($n_{PHICH}^{group}$, $n_{PHICH}^{seq}$) according to the lowest PRB index of the PUSCH-2, and a DMRS cyclic shift indicator in scheduling signaling, detects in the subframe 6 for a PHICH carrying ACK/NACK feedback information of the PUSCH-2 according to the parameter, and decides whether to retransmit the PUSCH-2, according to the feedback information in the PHICH. If the ACK/NACK feedback information is ACK, then the terminal will decide not to retransmit the PUSCH-2; and if the ACK/NACK feedback information is NACK, then the terminal will retransmit the PUSCH-2 according to the same scheduling information as initial transmission.

Of course, the terminal can also detect in the subframe 6 for a downlink control channel with an uplink DCI format, and if no downlink control channel with an uplink DCI format is detected, then reference will be made to the feedback information in the PHICH above; and if a downlink control channel with an uplink DCI format is detected, then the terminal will whether to decide retransmit the PUSCH-2, according to whether an NDI in the downlink control channel is inverted from an NDI corresponding to initial transmission of the PUSCH-2. Particularly if the NDI is the same as the NDI corresponding to initial transmission, then the terminal will decide to retransmit the PUSCH-3, and retransmit the PUSCH-2 according to scheduling information in the downlink control channel (i.e., an indicated resource, modulation and coding level, etc.); and if the NDI is different from the NDI corresponding to initial transmission, then the terminal will determine that new data are to be transmitted, and start to transmit the new data, according to the scheduling information, that is, the terminal will determine that the PUSCH-3 has been transmitted successfully, and will not be retransmitted.

All the embodiments above have been described taking a dynamically scheduled PUSCH as an example, and the methods according to the embodiments of the invention can also be equally applicable to SPS of a PUSCH, but the only difference lies in that for SPS of a PUSCH, a defined NDI is not inverted, but 1 represents retransmission, and 0 represents initial transmission, and all the other processing is the same as a dynamically scheduled PUSCH, so a repeated description thereof will be omitted here.

The first and second embodiments above have been described taking an asynchronous HARQ of a PUSCH in an UpPTS as an example, and they can also be equally applicable to a synchronous HARQ of a PUSCH in an UpPTS; and if there is a synchronous HARQ, then there will be a similar process except that the subframe in which the base station side transmits the downlink control channel corresponding to the PUSCH in the UpPTS is a fixed subframe position determined according to Table 7 using the subframe number of the UpPTS instead of any one subframe subsequent to the special subframe, or any one subframe in a preset period of time subsequent to the special subframe, and the terminal side detects in a fixed subframe position determined according to Table 7 using the subframe number of the UpPTS instead of each subframe subsequent to the UpPTS, or each subframe in a preset period of time subsequent to the UpPTS, for a downlink control channel corresponding to the PUSCH in the UpPTS.

The processing flows of the methods above can be performed in software program, the software program can be stored in a storage medium, and the stored software program can perform the steps in the methods above upon being invoked.

Figure 4:
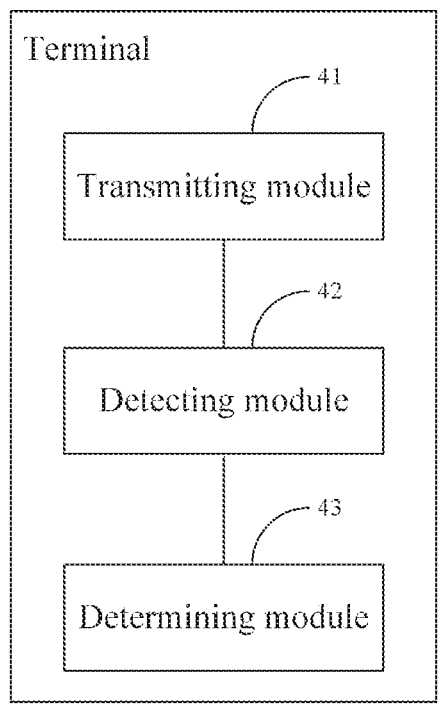
FIG. 4 is a schematic diagram of a terminal according to an embodiment of the invention.

Based upon the same inventive idea. FIG. 4 illustrates a terminal according to an embodiment of the invention, where the terminal includes:

a transmitting module 41 is configured to transmit a Physical Uplink Shared Channel (PUSCH) in a special subframe m, where m is an integer;

a detecting module 42 is configured to detect in a subframe including a downlink transmission resource subsequent to the special subframe m, or in a subframe m+k, for a downlink control channel with an uplink Downlink Control Information (DCI) format, where k is a positive integer; and a determining module 43 is configured to decide whether to retransmit the PUSCH transmitted in the special subframe m, according to the downlink control channel.

In a possible implementation, k is defined as follows:

for the TDD uplink-downlink configuration 0, if m is 1 or 6, then k will be 4, 5, 9, or 10; or for the TDD uplink-downlink configuration 1, if m is 1 or 6, then k will be 3, 5, 8, or 10; or for the TDD uplink-downlink configuration 2, if m is 1 or 6, then k will be 2 or 7; or for the TDD uplink-downlink configuration 3, if m is 1, then k will be 7, 8, or 9; or for the TDD uplink-downlink configuration 4, if m is 1, then k will be 7 or 8; or for the TDD uplink-downlink configuration 5, if m is 1, then k will be 7; or for the TDD uplink-downlink configuration 6, if m is 1, then k will be 4, 5, 8, 9, or 10; or for the TDD uplink-downlink configuration 6, if m is 6, then k will be 3, 4, 5, 9, or 10.

Further to any one of the embodiments above, the determining module is configured:

to determine whether the downlink control channel corresponds to a PUSCH transmitted in a special subframe, according to the downlink control channel; and after it is determined that the downlink control channel corresponds to a PUSCH transmitted in a special subframe, to decide whether to retransmit the PUSCH transmitted in the special subframe m, according to an indicating field, for indicating whether to retransmit the PUSCH, carried in the downlink control channel.

In a possible implementation, the determining module is configured:

to determine whether the downlink control channel corresponds to a PUSCH transmitted in a special subframe, according to the size of the uplink DCI format for the downlink control channel; and/or to determine whether the downlink control channel corresponds to a PUSCH transmitted in a special subframe, according to a first indicating field in the downlink control channel, where the first indicating field indicates information about a PUSCH corresponding to the downlink control channel; and/or to determine whether the downlink control channel corresponds to a PUSCH transmitted in a special subframe, according to a second indicating field in the downlink control channel, where the second indicating field indicates whether a PUSCH corresponding to the downlink control channel is a PUSCH transmitted in a special subframe, or a PUSCH in a normal subframe; and/or to determine whether the downlink control channel corresponds to a PUSCH transmitted in a special subframe, according to a Radio Network Temporary Identifier (RNTI) for scrambling the downlink control channel; and/or to determine whether the downlink control channel corresponds to a PUSCH transmitted in a special subframe, according to a 2-bit uplink (UL) index indicating field in the downlink control channel.

In a possible implementation, the determining module is configured:

if the detecting module detects that the uplink DCI format for the downlink control channel has a first DCI size, to determine that the downlink control channel corresponds to a PUSCH transmitted in a special subframe; or if the detecting module detects that the uplink DCI format for the downlink control channel has a second DCI size, to determine that the downlink control channel corresponds to a PUSCH transmitted in a normal subframe; where the first DCI size is different from the second DCI size.

In a possible implementation, the first indicating field carries a Hybrid-Automatic Repeat Request (HARQ) process number of the PUSCH corresponding to the downlink control channel.

In a possible implementation, the determining module is configured:

if the detecting module detects that the downlink control channel is scrambled using a first RNTI, to determine that the downlink control channel corresponds to a PUSCH transmitted in a special subframe; or if the detecting module detects that the downlink control channel is scrambled using a second RNTI, to determine that the downlink control channel corresponds to a PUSCH transmitted in a normal subframe; where the first RNTI is different from the second RNTI.

In a possible implementation, if the RNTI corresponding to the special subframe is shared by a plurality of terminals, then the determining module will be further configured:

to determine the position, of an indicating field for indicating whether to retransmit the PUSCH, corresponding to the terminal, in the downlink control channel according to the index of the terminal.

In a possible implementation, the subframe m+k is different from a subframe detected for a downlink control channel corresponding to a PUSCH transmitted in a normal subframe.

Where k is defined as follows:

for the TDD uplink-downlink configuration 1, if m is 1 or 6, then k will be 4 or 9; or for the TDD uplink-downlink configuration 2, if m is 1 or 6, then k will be 3, 4, 5, 8, 9, or 10; or for the TDD uplink-downlink configuration 3, if m is 1, then k will be 4, 5, 6, or 10; or for the TDD uplink-downlink configuration 4, if m is 1, then k will be 3, 4, 5, 6, 9, or 10; or for the TDD uplink-downlink configuration 5, if m is 1, then k will be 2, 3, 4, 5, 6, 8, 9, or 10.

In a possible implementation, the determining module is configured:

to decide whether to retransmit the PUSCH transmitted in the special subframe m, according to an indicating field, for indicating whether to retransmit the PUSCH, carried in the downlink control channel.

In a possible implementation, the determining module is configured:

when both a Least Significant Bit (LSB) and a Most Significant Bit (MSB) in the UL index are set to 0, to determine that the downlink control channel corresponds to a PUSCH transmitted in a special subframe; and when at least one of the LSB or the MSB in the UL index is set to 1, to determine that the downlink control channel corresponds to a PUSCH transmitted in a normal uplink subframe.

Figure 5:
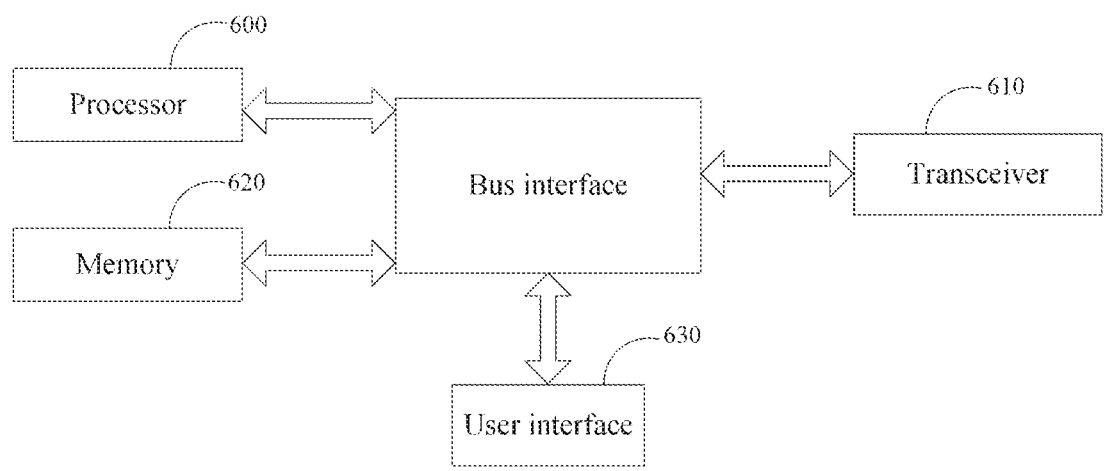
FIG. 5 is a schematic diagram of another terminal according to an embodiment of the invention.

Based upon the same inventive idea, FIG. 5 illustrates another terminal according to an embodiment of the invention, where the terminal includes a transceiver 610, and at least one processor 600 connected with the transceiver 610, where:

the processor 600 is configured to read and execute program in a memory 620:

to control the transceiver 610 to transmit a PUSCH in a special subframe m, where m is an integer; to detect in a subframe including a downlink transmission resource subsequent to the special subframe m, or in a subframe m+k, for a downlink control channel with an uplink DCI format, where k is a positive integer; and to decide whether to retransmit the PUSCH transmitted in the special subframe m, according to the downlink control channel; and the transceiver 610 is configured to receive and transmit data under the control of the processor 600.

Here in FIG. 5, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different UEs, the user interface 630 can be an interface via which desirable devices can be connected externally and internally, where the connected devices include but will not be limited to a keypad, a display, a loudspeaker, a microphone, a joystick, etc. The processor 600 is responsible for managing the bus architecture and performing normal processes, and the memory 620 can store data for use by the processor 600 in performing the operations.

In this embodiment, the processor 600 reads the program in the memory 620, and performs the operations performed by the detecting module 42 and the determining module 43 in the embodiment as illustrated in FIG. 4, and the transceiver 610 performs the operations performed by the transmitting module 41 in the embodiment as illustrated in FIG. 4, so reference can be made to the description of the embodiment as illustrated in FIG. 4 for details thereof, and a repeated description thereof will be omitted here.

Figure 6:
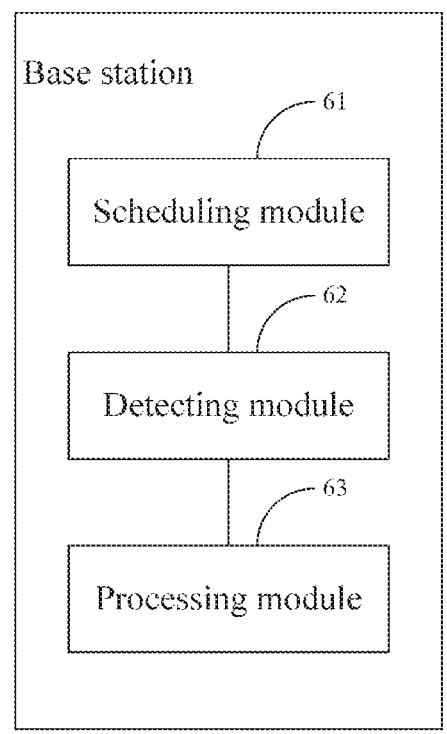
FIG. 6 is a schematic diagram of an eNB according to an embodiment of the invention.

Based upon the same inventive idea, FIG. 6 illustrates a base station according to an embodiment of the invention, where the base station includes:

a scheduling module 61 is configured to schedule a terminal to transmit a Physical Uplink Shared Channel (PUSCH) in a special subframe m, where m is an integer;

a detecting module 62 is configured to detect in the special subframe m for a PUSCH transmitted by the terminal; and a processing module 63 is configured to transmit a downlink control channel with an uplink DCI format to the terminal in a subframe including a downlink transmission resource subsequent to the special subframe m, or in a subframe m+k, for a downlink control channel with an uplink DCI format, where k is a positive integer, and the downlink control channel carries an indicating field for indicating whether to retransmit the PUSCH transmitted in the special subframe m.

In a possible implementation, k is defined as follows:
for the TDD uplink-downlink configuration 0, if m is 1 or 6, then k will be 4, 5, 9, or 10; or
for the TDD uplink-downlink configuration 1, if m is 1 or 6, then k will be 3, 5, 8, or 10; or
for the TDD uplink-downlink configuration 2, if m is 1 or 6, then k will be 2 or 7; or
for the TDD uplink-downlink configuration 3, if m is 1, then k will be 7, 8, or 9; or
for the TDD uplink-downlink configuration 4, if m is 1, then k will be 7 or 8; or
for the TDD uplink-downlink configuration 5, if m is 1, then k will be 7; or
for the TDD uplink-downlink configuration 6, if m is 1, then k will be 4, 5, 8, 9, or 10; or
for the TDD uplink-downlink configuration 6, if m is 6, then k will be 3, 4, 5, 9, or 10.

Further to any one of the embodiments above, the processing module is configured:
to determine the size of the uplink DCI format for the downlink control channel according to whether the downlink control channel corresponds to a PUSCH transmitted in a special subframe; and/or
to carry a first indicating field in the downlink control channel, where the first indicating field indicates information about a PUSCH corresponding to the downlink control channel; and/or
to carry a second indicating field in the downlink control channel, where the second indicating field indicates whether a PUSCH corresponding to the downlink control channel is a PUSCH transmitted in a special subframe, or a PUSCH in a normal subframe; and/or
to determine a Radio Network Temporary Identifier (RNTI) for scrambling the downlink control channel, according to whether the downlink control channel corresponds to a PUSCH transmitted in a special subframe; and/or
to determine the value of a 2-bit uplink (UL) index indicating field in the downlink control channel according to whether the downlink control channel corresponds to a PUSCH transmitted in a special subframe.

In a possible implementation, the processing module is configured:
if the downlink control channel corresponds to a PUSCH transmitted in a special subframe, to determine that the uplink DCI format for the downlink control channel has a first DCI size; or if the downlink control channel corresponds to a PUSCH transmitted in a normal subframe, then the base station will determine that the uplink DCI format for the downlink control channel has a second DCI size; where the first DCI size is different from the second DCI size.

In a possible implementation, the first indicating field carries an HARQ process number of the PUSCH corresponding to the downlink control channel.

In a possible implementation, the processing module is configured:
if the downlink control channel corresponds to a PUSCH transmitted in a special subframe, to determine that the downlink control channel is scrambled using a first RNTI; or if the downlink control channel corresponds to a PUSCH transmitted in a normal subframe, to determine that the downlink control channel is scrambled using a second RNTI; where the first RNTI is different from the second RNTI.

In a possible implementation, if the RNTI corresponding to the special subframe is shared by a plurality of terminals, then the processing module will be further configured:
to map the indicating fields, for indicating whether to retransmit PUSCHs, of the plurality of terminals to corresponding positions in the downlink control channel corresponding to a special subframe according to indexes of the plurality of terminals.

In a possible implementation, the subframe m+k is different from a subframe detected for a downlink control channel corresponding to a PUSCH transmitted in a normal subframe.

In this implementation, optionally k is defined as follows:
for the TDD uplink-downlink configuration 1, m is 1 or 6, and k is 4 or 9; or
for the TDD uplink-downlink configuration 2, m is 1 or 6, and k is 3, 4, 5, 8, 9, or 10; or
for the TDD uplink-downlink configuration 3, m is 1, and k is 4, 5, 6, or 10; or
for the TDD uplink-downlink configuration 4, m is 1, and k is 3, 4, 5, 6, 9, or 10; or
for the TDD uplink-downlink configuration 5, m is 1, and k is 2, 3, 4, 5, 6, 8, 9, or 10.

In a possible implementation, the processing module is configured:

if the downlink control channel corresponds to a PUSCH transmitted in a special subframe, to set both a Least Significant Bit (LSB) and a Most Significant Bit (MSB) in the UL index to 0; and if the downlink control channel corresponds to a PUSCH transmitted in a normal subframe, to set at least one of the LSB and the MSB in the UL index to 1.

Figure 7:
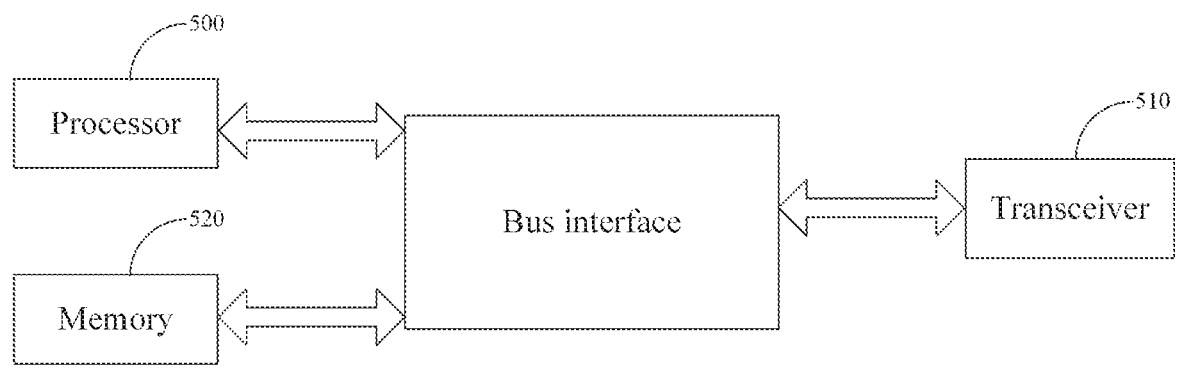
FIG. 7 is a schematic diagram of another eNB according to an embodiment of the invention.

Based upon the same inventive idea, FIG. 7 illustrates another base station according to an embodiment of the invention, where the base station includes a transceiver 510, and at least one processor 500 connected with the transceiver 510, where:

the processor 500 is configured to read and execute program in a memory 520:

to schedule a terminal through the transceiver 510 to transmit a Physical Uplink Shared Channel (PUSCH) in a special subframe m, where m is an integer; to detect in the special subframe m for a PUSCH transmitted by the terminal; and to control the transceiver 510 to transmit a downlink control channel with an uplink DCI format to the terminal in a subframe including a downlink transmission resource subsequent to the special subframe m, or in a subframe m+k, for a downlink control channel an uplink DCI format, where k is a positive integer, and the downlink control channel carries an indicating field for indicating whether to retransmit the PUSCH transmitted in the special subframe m; and the transceiver 510 is configured to receive and transmit data under the control of the processor 500.

Here in FIG. 7, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and the memory 520 can store data for use by the processor 500 in performing the operations.

In this embodiment, the processor 500 reads the program in the memory 520, and performs the operations performed by the scheduling module 61, the detecting module 62, and the processing module 63 in the embodiment as illustrated in FIG. 6, so reference can be made to the description of the embodiment as illustrated in Fig. for details thereof, and a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for receiving feedback information of uplink transmission, the method comprising:

transmitting, by a terminal, a Physical Uplink Shared Channel (PUSCH) in a special subframe m, wherein m is an integer;

detecting, by the terminal, a downlink control channel with an uplink Downlink Control Information (DCI) format, in a subframe comprising a downlink transmission resource subsequent to the special subframe m, or in a subframe m+k, wherein k is a positive integer; and deciding, by the terminal, whether to retransmit the PUSCH transmitted in the special subframe m, according to the downlink control channel.

2. The method according to claim 1, wherein k is defined as follows:

for the Time Division Duplex (TDD) uplink-downlink configuration 0, if m is 1 or 6, then k will be 4, 5, 9, or 10; or for the TDD uplink-downlink configuration 1, in response to that m is 1 or 6, k is 3, 5, 8, or 10; or for the TDD uplink-downlink configuration 2, in response to that m is 1 or 6, k is 2 or 7; or for the TDD uplink-downlink configuration 3, in response to that m is 1, k is 7, 8, or 9; or for the TDD uplink-downlink configuration 4, in response to that m is 1, k is 7 or 8; or for the TDD uplink-downlink configuration 5, in response to that m is 1, k is 7; or for the TDD uplink-downlink configuration 6, in response to that m is 1, k is 4, 5, 8, 9, or 10; or for the TDD uplink-downlink configuration 6, in response to that m is 6, k is 3, 4, 5, 9, or 10; or the subframe m+k is different from a subframe detected for a downlink control channel corresponding to a PUSCH transmitted in a normal subframe.

3. The method according to claim 2, wherein when the subframe m+k is different from a subframe detected for a downlink control channel corresponding to a PUSCH transmitted in a normal subframe, k is defined as follows:

for the TDD uplink-downlink configuration 1, in response to that m is 1 or 6, k is 4 or 9; or for the TDD uplink-downlink configuration 2, in response to that m is 1 or 6, k is 3, 4, 5, 8, 9, or 10; or for the TDD uplink-downlink configuration 3, in response to that m is 1, k is 4, 5, 6, or 10; or for the TDD uplink-downlink configuration 4, in response to that m is 1, k is 3, 4, 5, 6, 9, or 10; or for the TDD uplink-downlink configuration 5, in response to that m is 1, k is 2, 3, 4, 5, 6, 8, 9, or 10; and/or the deciding, by the terminal, whether to retransmit the PUSCH transmitted in the special subframe m, according to the downlink control channel comprises:

deciding, by the terminal, whether to retransmit the PUSCH transmitted in the special subframe m, according to an indicating field for indicating whether to retransmit the PUSCH, the indicating field is carried in the downlink control channel.

4. The method according to claim 1, wherein deciding, by the terminal, whether to retransmit the PUSCH transmitted in the special subframe m, according to the downlink control channel comprises:

determining, by the terminal, whether the downlink control channel corresponds to a PUSCH transmitted in a special subframe, according to the downlink control channel; and after it is determined that the downlink control channel corresponds to a PUSCH transmitted in a special subframe, deciding, by the terminal, whether to retransmit the PUSCH transmitted in the special subframe m, according to an indicating field for indicating whether to retransmit the PUSCH, the indicating field is carried in the downlink control channel.

5. The method according to claim 4, wherein determining, by the terminal, whether the downlink control channel corresponds to a PUSCH transmitted in a special subframe, according to the downlink control channel comprises:

determining, by the terminal, whether the downlink control channel corresponds to a PUSCH transmitted in a special subframe, according to a size of the uplink DCI format for the downlink control channel; and/or determining, by the terminal, whether the downlink control channel corresponds to a PUSCH transmitted in a special subframe, according to a first indicating field in the downlink control channel, wherein the first indicating field indicates information about a PUSCH corresponding to the downlink control channel; and/or determining, by the terminal, whether the downlink control channel corresponds to a PUSCH transmitted in a special subframe, according to a second indicating field in the downlink control channel, wherein the second indicating field indicates whether a PUSCH corresponding to the downlink control channel is a PUSCH transmitted in a special subframe, or a PUSCH in a normal subframe; and/or determining, by the terminal, whether the downlink control channel corresponds to a PUSCH transmitted in a special subframe, according to a Radio Network Temporary Identifier (RNTI) for scrambling the downlink control channel; and/or determining, by the terminal, whether the downlink control channel corresponds to a PUSCH transmitted in a special subframe, according to a 2-bit uplink (UL) index indicating field in the downlink control channel.

6. The method according to claim 5, wherein determining, by the terminal, whether the downlink control channel corresponds to a PUSCH transmitted in a special subframe, according to the size of the uplink DCI format for the downlink control channel comprises:

in response to that the terminal detects that the uplink DCI format for the downlink control channel has a first DCI size, determining, by the terminal, that the downlink control channel corresponds to a PUSCH transmitted in a special subframe; or in response to that the terminal detects that the uplink DCI format for the downlink control channel has a second DCI size, determining, by the terminal, that the downlink control channel corresponds to a PUSCH transmitted in a normal subframe;

wherein the first DCI size is different from the second DCI size;

wherein the determining, by the terminal, whether the downlink control channel corresponds to a PUSCH transmitted in a special subframe, according to a first indicating field in the downlink control channel comprises: the first indicating field carries a Hybrid-Automatic Repeat Request (HARD) process number of the PUSCH corresponding to the downlink control channel;

wherein the determining, by the terminal, whether the downlink control channel corresponds to a PUSCH transmitted in a special subframe, according to the RNTI for scrambling the downlink control channel comprises:

in response to that the terminal detects that the downlink control channel is scrambled using a first RNTI, determining, by the terminal, that the downlink control channel corresponds to a PUSCH transmitted in a special subframe; or in response to that the terminal detects that the downlink control channel is scrambled using a second RNTI, determining, by the terminal, that the downlink control channel corresponds to a PUSCH transmitted in a normal subframe;

wherein the first RNTI is different from the second RNTI;

wherein determining, by the terminal, whether the downlink control channel corresponds to a PUSCH transmitted in a special subframe, according to the 2-bit uplink (UL) index indicating field in the downlink control channel comprises:

when both a Least Significant Bit (LSB) and a Most Significant Bit (MSB) in the UL index are set to 0, determining, by the terminal, that the downlink control channel corresponds to a PUSCH transmitted in a special subframe;

when at least one of the LSB and the MSB in the UL index is set to 1, determining, by the terminal, that the downlink control channel corresponds to a PUSCH transmitted in a normal uplink subframe.

7. The method according to claim 6, wherein in response to that the first RNTI is shared by a plurality of terminals, after the terminal determines that the downlink control channel corresponds to a PUSCH transmitted in a special subframe, the method further comprises:

determining, by the terminal, a position, of an indicating field for indicating whether to retransmit the PUSCH, corresponding to the terminal, in the downlink control channel according to an index of the terminal.

8. A method for transmitting feedback information of uplink transmission, the method comprising:

scheduling, by a base station, a terminal to transmit a Physical Uplink Shared Channel (PUSCH) in a special subframe m, wherein m is an integer;

detecting, by the base station, a PUSCH transmitted by the terminal in the special subframe m; and transmitting, by the base station, a downlink control channel with an uplink Downlink Control Information (DCI) format to the terminal in a subframe comprising a downlink transmission resource subsequent to the special subframe m, or in a subframe m+k, wherein k is a positive integer, and the downlink control channel carries an indicating field for indicating whether to retransmit the PUSCH transmitted in the special subframe m.

9. The method according to claim 8, wherein k is defined as follows:

for the Time Division Duplex (TDD) uplink-downlink configuration 0, if m is 1 or 6, k is 4, 5, 9, or 10; or for the TDD uplink-downlink configuration 1, in response to that m is 1 or 6, k is 3, 5, 8, or 10; or for the TDD uplink-downlink configuration 2, in response to that m is 1 or 6, k is 2 or 7; or for the TDD uplink-downlink configuration 3, in response to that m is 1, k is 7, 8, or 9; or for the TDD uplink-downlink configuration 4, in response to that m is 1, k is 7 or 8; or for the TDD uplink-downlink configuration 5, in response to that m is 1, k is 7; or for the TDD uplink-downlink configuration 6, in response to that m is 1, k is 4, 5, 8, 9, or 10; or for the TDD uplink-downlink configuration 6, in response to that m is 6, k is 3, 4, 5, 9, or 10; or wherein the subframe m+k is different from a subframe detected for a downlink control channel corresponding to a PUSCH transmitted in a normal subframe.

10. The method according to claim 9, wherein when the subframe m+k is different from a subframe detected for a downlink control channel corresponding to a PUSCH transmitted in a normal subframe, k is defined as follows:

for the TDD uplink-downlink configuration 1, in response to that m is 1 or 6, k is 4 or 9; or for the TDD uplink-downlink configuration 2, in response to that m is 1 or 6, k is 3, 4, 5, 8, 9, or 10; or for the TDD uplink-downlink configuration 3, in response to that m is 1, k is 4, 5, 6, or 10; or for the TDD uplink-downlink configuration 4, in response to that m is 1, k is 3, 4, 5, 6, 9, or 10; or for the TDD uplink-downlink configuration 5, in response to that m is 1, k is 2, 3, 4, 5, 6, 8, 9, or 10.

11. The method according to claim 8, wherein transmitting, by the base station, the downlink control channel with the uplink DCI format to the terminal comprises:

determining, by the base station, a size of the uplink DCI format for the downlink control channel according to whether the downlink control channel corresponds to a PUSCH transmitted in a special subframe; and/or carrying, by the base station, a first indicating field in the downlink control channel, wherein the first indicating field indicates information about a PUSCH corresponding to the downlink control channel; and/or carrying, by the base station, a second indicating field in the downlink control channel, wherein the second indicating field indicates whether a PUSCH corresponding to the downlink control channel is a PUSCH transmitted in a special subframe, or a PUSCH in a normal subframe; and/or determining, by the base station, a Radio Network Temporary Identifier (RNTI) for scrambling the downlink control channel, according to whether the downlink control channel corresponds to a PUSCH transmitted in a special subframe; and/or determining, by the base station, a value of a 2-bit uplink (UL) index indicating field in the downlink control channel according to whether the downlink control channel corresponds to a PUSCH transmitted in a special subframe.

12. The method according to claim 11, wherein determining, by the base station, the size of the uplink DCI format for the downlink control channel according to whether the downlink control channel corresponds to a PUSCH transmitted in a special subframe comprises:

in response to that the downlink control channel corresponds to a PUSCH transmitted in a special subframe, determining, by the base station, that the uplink DCI format for the downlink control channel has a first DCI size; or in response to that the downlink control channel corresponds to a PUSCH transmitted in a normal subframe, determining, by the base station, that the uplink DCI format for the downlink control channel has a second DCI size;

wherein the first DCI size is different from the second DCI size;

wherein carrying, by the base station, a first indicating field in the downlink control channel, comprises: the first indicating field carries an HARQ process number of the PUSCH corresponding to the downlink control channel;

wherein determining, by the base station, the RNTI for scrambling the downlink control channel, according to whether the downlink control channel corresponds to a PUSCH transmitted in a special subframe comprises:

in response to that the downlink control channel corresponds to a PUSCH transmitted in a special subframe, determining, by the base station, that the downlink control channel is scrambled using a first RNTI; or in response to that the downlink control channel corresponds to a PUSCH transmitted in a normal subframe, determining, by the base station, that the downlink control channel is scrambled using a second RNTI;

wherein the first RNTI is different from the second RNTI;

the determining, by the base station, the value of the 2-bit uplink (UL) index indicating field in the downlink control channel according to whether the downlink control channel corresponds to a PUSCH transmitted in a special subframe comprises:

in response to that the downlink control channel corresponds to a PUSCH transmitted in a special subframe, setting, by the base station, both a Least Significant Bit (LSB) and a Most Significant Bit (MSB) in the UL index to 0; and in response to that the downlink control channel corresponds to a PUSCH transmitted in a normal subframe, setting, by the base station, at least one of the LSB and the MSB in the UL index to 1.

13. The method according to claim 12, wherein in response to that the RNTI corresponding to the special subframe is shared by a plurality of terminals, then the method further comprises:

mapping, by the base station, the indicating fields for indicating whether to retransmit PUSCHs, of the plurality of terminals to corresponding positions in the downlink control channel corresponding to a special subframe according to indexes of the plurality of terminals.

14. A terminal, comprising a transceiver, and at least one processor connected with the transceiver, wherein:

the processor is configured to read and execute program in a memory:

to control the transceiver to transmit a PUSCH in a special subframe m, wherein m is an integer; to detect a downlink control channel with an uplink DCI format in a subframe comprising a downlink transmission resource subsequent to the special subframe m, or in a subframe m+k, wherein k is a positive integer; and to decide whether to retransmit the PUSCH transmitted in the special subframe m, according to the downlink control channel; and the transceiver is configured to receive and transmit data under the control of the processor.

15. The terminal according to claim 14, wherein k is defined as follows:

for the Time Division Duplex (TDD) uplink-downlink configuration 0, in response to that m is 1 or 6, then k will be 4, 5, 9, or 10; or for the TDD uplink-downlink configuration 1, in response to that m is 1 or 6, k is 3, 5, 8, or 10; or for the TDD uplink-downlink configuration 2, in response to that m is 1 or 6, k is 2 or 7; or for the TDD uplink-downlink configuration 3, in response to that m is 1, k is 7, 8, or 9; or for the TDD uplink-downlink configuration 4, in response to that m is 1, k is 7 or 8; or for the TDD uplink-downlink configuration 5, in response to that m is 1, k is 7; or for the TDD uplink-downlink configuration 6, in response to that m is 1, k is 4, 5, 8, 9, or 10; or for the TDD uplink-downlink configuration 6, in response to that m is 6, k is 3, 4, 5, 9, or 10; or the subframe m+k is different from a subframe detected for a downlink control channel corresponding to a PUSCH transmitted in a normal subframe.

16. The terminal according to claim 15, wherein when the subframe m+k is different from a subframe detected for a downlink control channel corresponding to a PUSCH transmitted in a normal subframe, k is defined as follows:

for the TDD uplink-downlink configuration 1, in response to that m is 1 or 6, k is 4 or 9; or for the TDD uplink-downlink configuration 2, in response to that m is 1 or 6, k is 3, 4, 5, 8, 9, or 10; or for the TDD uplink-downlink configuration 3, in response to that m is 1, k is 4, 5, 6, or 10; or for the TDD uplink-downlink configuration 4, in response to that m is 1, k is 3, 4, 5, 6, 9, or 10; or for the TDD uplink-downlink configuration 5, in response to that m is 1, k is 2, 3, 4, 5, 6, 8, 9, or 10; and/or wherein the processor is configured to read and execute program in a memory:

to decide whether to retransmit the PUSCH transmitted in the special subframe m, according to an indicating field for indicating whether to retransmit the PUSCH, the indicating field is carried in the downlink control channel.

17. The terminal according to claim 14, wherein the processor is configured to read and execute program in a memory:

to determine whether the downlink control channel corresponds to a PUSCH transmitted in a special subframe, according to the downlink control channel; and after it is determined that the downlink control channel corresponds to a PUSCH transmitted in a special subframe, to decide whether to retransmit the PUSCH transmitted in the special subframe m, according to an indicating field for indicating whether to retransmit the PUSCH, the indicating field is carried in the downlink control channel.

18. The terminal according to claim 17, wherein the processor is configured to read and execute program in a memory:

to determine whether the downlink control channel corresponds to a PUSCH transmitted in a special subframe, according to a size of the uplink DCI format for the downlink control channel; and/or to determine whether the downlink control channel corresponds to a PUSCH transmitted in a special subframe, according to a first indicating field in the downlink control channel, wherein the first indicating field indicates information about a PUSCH corresponding to the downlink control channel; and/or to determine whether the downlink control channel corresponds to a PUSCH transmitted in a special subframe, according to a second indicating field in the downlink control channel, wherein the second indicating field indicates whether a PUSCH corresponding to the downlink control channel is a PUSCH transmitted in a special subframe, or a PUSCH in a normal subframe; and/or to determine whether the downlink control channel corresponds to a PUSCH transmitted in a special subframe, according to a Radio Network Temporary Identifier (RNTI) for scrambling the downlink control channel; and/or to determine whether the downlink control channel corresponds to a PUSCH transmitted in a special subframe, according to a 2-bit uplink (UL) index indicating field in the downlink control channel.

19. The terminal according to claim 18, wherein the processor is configured to read and execute program in a memory:

in response to that the uplink DCI format for the downlink control channel has a first DCI size, to determine that the downlink control channel corresponds to a PUSCH transmitted in a special subframe; or in response to that the uplink DCI format for the downlink control channel has a second DCI size, to determine that the downlink control channel corresponds to a PUSCH transmitted in a normal subframe; wherein the first DCI size is different from the second DCI size;

wherein the processor is configured to read and execute program in a memory to determine whether the downlink control channel corresponds to a PUSCH transmitted in a special subframe, according to a first indicating field in the downlink control channel wherein the first indicating field carries a Hybrid-Automatic Repeat Request (HARD) process number of the PUSCH corresponding to the downlink control channel;

wherein the processor is configured to read and execute program in a memory:
in response to that the downlink control channel is scrambled using a first RNTI, to determine that the downlink control channel corresponds to a PUSCH transmitted in a special subframe; or
in response to that the downlink control channel is scrambled using a second RNTI, to determine that the downlink control channel corresponds to a PUSCH transmitted in a normal subframe; where the first RNTI is different from the second RNTI;

wherein the processor is configured to read and execute program in a memory:
when both a Least Significant Bit (LSB) and a Most Significant Bit (MSB) in the UL index are set to 0, to determine that the downlink control channel corresponds to a PUSCH transmitted in a special subframe; and
when at least one of the LSB or the MSB in the UL index is set to 1, to determine that the downlink control channel corresponds to a PUSCH transmitted in a normal uplink subframe..

20. The terminal according to claim 19, wherein in response to that the first RNTI is shared by a plurality of terminals, the processor is configured to read and execute program in a memory:
to determine a position, of an indicating field for indicating whether to retransmit the PUSCH, corresponding to the terminal, in the downlink control channel according to an index of the terminal.

21. A base station, comprising a transceiver, and at least one processor connected with the transceiver, wherein:
the processor is configured to read and execute program in a memory:
to schedule a terminal through the transceiver to transmit a Physical Uplink Shared Channel (PUSCH) in a special subframe m, wherein m is an integer; to detect a PUSCH transmitted by the terminal in the special subframe m; and to control the transceiver to transmit a downlink control channel with an uplink DCI format to the terminal in a subframe comprising a downlink transmission resource subsequent to the special subframe m, or in a subframe m+k, wherein k is a positive integer, and the downlink control channel carries an indicating field for indicating whether to retransmit the PUSCH transmitted in the special subframe m; and
the transceiver is configured to receive and transmit data under the control of the processor.

22. The base station according to claim 21, wherein k is defined as follows:
for the Time Division Duplex (TDD) uplink-downlink configuration 0, if m is 1 or 6, k is 4, 5, 9, or 10; or
for the TDD uplink-downlink configuration 1, in response to that m is 1 or 6, k is 3, 5, 8, or 10; or
for the TDD uplink-downlink configuration 2, in response to that m is 1 or 6, k is 2 or 7; or
for the TDD uplink-downlink configuration 3, in response to that m is 1, k is 7, 8, or 9; or
for the TDD uplink-downlink configuration 4, in response to that m is 1, k is 7 or 8; or
for the TDD uplink-downlink configuration 5, in response to that m is 1, k is 7; or
for the TDD uplink-downlink configuration 6, in response to that m is 1, k is 4, 5, 8, 9, or 10; or
for the TDD uplink-downlink configuration 6, in response to that m is 6, k is 3, 4, 5, 9, or 10; or
wherein the subframe m+k is different from a subframe detected for a downlink control channel corresponding to a PUSCH transmitted in a normal subframe.

23. The base station according to claim 22, wherein when the subframe m+k is different from a subframe detected for a downlink control channel corresponding to a PUSCH transmitted in a normal subframe, k is defined as follows:
for the TDD uplink-downlink configuration 1, in response to that m is 1 or 6, k is 4 or 9; or
for the TDD uplink-downlink configuration 2, in response to that m is 1 or 6, k is 3, 4, 5, 8, 9, or 10; or
for the TDD uplink-downlink configuration 3, in response to that m is 1, k is 4, 5, 6, or 10; or
for the TDD uplink-downlink configuration 4, in response to that m is 1, k is 3, 4, 5, 6, 9, or 10; or
for the TDD uplink-downlink configuration 5, in response to that m is 1, k is 2, 3, 4, 5, 6, 8, 9, or 10.

24. The base station according to claim 21, wherein the processor is configured to read and execute program in a memory:
to determine a size of the uplink DCI format for the downlink control channel according to whether the downlink control channel corresponds to a PUSCH transmitted in a special subframe; and/or
to carry a first indicating field in the downlink control channel, wherein the first indicating field indicates information about a PUSCH corresponding to the downlink control channel; and/or
to carry a second indicating field in the downlink control channel, wherein the second indicating field indicates whether a PUSCH corresponding to the downlink control channel is a PUSCH transmitted in a special subframe, or a PUSCH in a normal subframe; and/or
to determine a Radio Network Temporary Identifier (RNTI) for scrambling the downlink control channel, according to whether the downlink control channel corresponds to a PUSCH transmitted in a special subframe; and/or
to determine the value of a 2-bit uplink (UL) index indicating field in the downlink control channel according to whether the downlink control channel corresponds to a PUSCH transmitted in a special subframe.

25. The base station according to claim 24, wherein the processor is configured to read and execute program in a memory:
in response to that the downlink control channel corresponds to a PUSCH transmitted in a special subframe, to determine that the uplink DCI format for the downlink control channel has a first DCI size; or in response to that the downlink control channel corresponds to a PUSCH transmitted in a normal subframe, to determine that the uplink DCI format for the downlink control channel has a second DCI size; wherein the first DCI size is different from the second DCI size;
wherein the processor is configured to read and execute program in a memory to determine whether the downlink control channel corresponds to a PUSCH transmitted in a special subframe, according to a first indicating field in the downlink control channel, wherein the first indicating field carries an HARQ process number of the PUSCH corresponding to the downlink control channel
wherein the processor is configured to read and execute program in a memory:
in response to that the downlink control channel corresponds to a PUSCH transmitted in a special subframe, to determine that the downlink control channel is scrambled using a first RNTI; or in response to that the downlink control channel corresponds to a PUSCH transmitted in a normal subframe, to determine that the downlink control channel is scrambled using a second RNTI; wherein the first RNTI is different from the second RNTI;
wherein the processor is configured to read and execute program in a memory:
in response to that the downlink control channel corresponds to a PUSCH transmitted in a special subframe, to set both a Least Significant Bit (LSB) and a Most Significant Bit (MSB) in the UL index to 0; and
in response to that the downlink control channel corresponds to a PUSCH transmitted in a normal subframe, to set at least one of the LSB and the MSB in the UL index to 1.

26. The base station according to claim 25, wherein in response to that the RNTI corresponding to the special subframe is shared by a plurality of terminals, the processor is configured to read and execute program in a memory:
to map the indicating fields for indicating whether to retransmit PUSCHs, of the plurality of terminals to corresponding positions in the downlink control channel corresponding to a special subframe according to indexes of the plurality of terminals.

* * * * *